(12) United States Patent  
Suzuki

(10) Patent No.: US 9,441,127 B2  
(45) Date of Patent: Sep. 13, 2016

(54) POLYMERIZABLE COMPOSITION, INK COMPOSITION FOR INK-JET RECORDING, METHOD OF INK-JET RECORDING, AND PRINTED ARTICLE

(71) Applicant: FUJIFILM CORPORATION, Minato-ku, Tokyo (JP)

(72) Inventor: Shota Suzuki, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/849,601

(22) Filed: Sep. 10, 2015

(65) Prior Publication Data

US 2016/0090494 A1 Mar. 31, 2016

(30) Foreign Application Priority Data

Sep. 26, 2014 (JP) ................................. 2014-197312

(51) Int. Cl.
| | |
|---|---|
| *C09D 11/30* | (2014.01) |
| *B32B 3/00* | (2006.01) |
| *B41J 2/02* | (2006.01) |
| *B41J 2/01* | (2006.01) |
| *C09D 11/101* | (2014.01) |
| *C09D 11/106* | (2014.01) |
| *C09D 133/14* | (2006.01) |
| *C09D 139/04* | (2006.01) |
| *C09D 139/06* | (2006.01) |
| *B41M 7/00* | (2006.01) |

(52) U.S. Cl.
CPC ................ *C09D 11/30* (2013.01); *B32B 3/00* (2013.01); *B41J 2/01* (2013.01); *B41J 2/02* (2013.01); *C09D 11/101* (2013.01); *C09D 11/106* (2013.01); *C09D 133/14* (2013.01); *C09D 139/04* (2013.01); *C09D 139/06* (2013.01); *B41M 7/0081* (2013.01)

(58) Field of Classification Search
CPC ....... B32B 3/00; B41M 7/0081; B41M 2/01; B41M 2/02
See application file for complete search history.

(56) References Cited

U.S. PATENT DOCUMENTS

| | | | | |
|---|---|---|---|---|
| 2003/0172843 A1* | 9/2003 | Blease | ................... | C09D 11/40 106/31.49 |
| 2008/0206527 A1* | 8/2008 | Hayata | ................. | C09D 11/101 428/195.1 |
| 2011/0064919 A1* | 3/2011 | Grant | .................... | C09D 11/36 428/195.1 |

FOREIGN PATENT DOCUMENTS

| | | |
|---|---|---|
| EP | 1400545 A2 | 3/2004 |
| EP | 1912215 A1 | 4/2008 |
| JP | 2010-001437 A | 1/2010 |
| JP | 2013-082916 A | 5/2013 |
| WO | 2013046679 A2 | 4/2013 |

OTHER PUBLICATIONS

Extended European Search Report dated Feb. 4, 2016, issued in corresponding EP Patent Application.

* cited by examiner

*Primary Examiner* — Betelhem Shewareged

(74) *Attorney, Agent, or Firm* — SOLARIS Intellectual Property Group, PLLC

(57) ABSTRACT

A polymerizable composition includes: a polymer compound; a polymerization initiator; and a polymerizable compound. The polymer compound contains at least one of a repeating unit represented by the following Formula (1) or a repeating unit represented by the following Formula (2). An ink composition for ink-jet recording includes the polymerizable composition. A method of ink jet recording and a printed article use the ink composition.

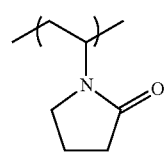

Formula (1)

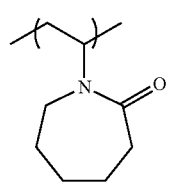

Formula (2)

15 Claims, No Drawings

POLYMERIZABLE COMPOSITION, INK COMPOSITION FOR INK-JET RECORDING, METHOD OF INK-JET RECORDING, AND PRINTED ARTICLE

CROSS-REFERENCE TO RELATED APPLICATIONS

This application claims priority from Japanese Patent Application No. 2014-197312, filed Sep. 26, 2014, the disclosure of which is incorporated herein by reference in its entirety.

BACKGROUND

1. Technical Field

The present invention relates to a polymerizable composition, an ink composition for ink-jet recording, a method of ink-jet recording, and a printed article.

2. Background Art

A polymerizable composition, which includes a polymerization initiator and a polymerizable compound, and which cures through polymerization of the polymerizable compound accelerated by an active species generated from the polymerization initiator by application of an energy, is used for various applications such as a curable ink composition, a coating agent, a paint, or an image recording layer of a planographic printing plate.

As one application of a polymerizable composition, for example, an application of the polymerizable composition to an image recording method in which an image is recorded on a recording medium such as a paper based on an image data signal is examined. As image recording methods, a variety of recording methods such as an electrophotographic method, a thermal transfer method, and an ink-jet method are known. In particular, an ink-jet method has advantages in that it requires low running cost and generates low noise since an image can be recorded with an inexpensive apparatus and an image is directly recorded by discharging an ink in a required area.

For example, in a recording method utilizing an ink-jet method, recording can be performed not only on a paper medium such as a plain paper but also on a non-water-absorptive recording medium such as a plastic film or a metal plate. However, since an ink applied on a non-water-absorptive recording medium is not absorbed, it is difficult to speed up recording and to record a high quality image, and further, insufficient adhesion of a recorded image to a recording medium is likely to occur.

For example, in the case of a recording method in which an ink curable by irradiation of an active energy radiation is discharged using an ink-jet method, the ink is discharged, and then irradiated with the active energy radiation so that the ink droplet cures. This enables improvement of recording speed and formation of an image which is sharper and whose adhesion is improved.

In this method, improvement effects can be expected in terms of recording speed, quality of an image and insufficient adhesion of an image by realizing a high sensitivity of an ink for ink-jet recording which is curable by irradiation of an active energy radiation such as an ultraviolet ray and by improving the curability. It is speculated that realizing a high sensitivity contributes to improvement of the strength of a recorded image.

As a technique related to the above, an ink-jet ink composition including a dendritic amide polymer compound having a branched structure, a polymerization initiator, and a radical polymerizable compound is disclosed, and the ink jet ink composition is considered to be excellent in adhesion of an ink image film to a substrate, film strength, and discharge stability of an ink image (see, for example, Japanese Patent Application Laid-Open (JP-A) No. 2013-082916).

As another technique, an ink composition including a polymer including a thiol group and, on a side chain, a partial structure selected from the group consisting of a fluorine-substituted hydrocarbon group, a siloxane skeleton, and a long chain alkyl group, a photopolymerization initiator, and a polymerizable compound is disclosed (see, for example, JP-A No. 2010-001437). Such an ink composition has a favorable curing sensitivity and has excellent scratch resistance, blocking properties or the like, since a polymer including a thiol group and a partial structure having a surface orientation segregates on the surface of the ink composition, increasing cross-linking density.

SUMMARY OF THE INVENTION

Technical Problem

However, although an image having a film strength to some degree may be obtained by the above-described conventional technique, adhesion of a cured film formed by an ink to a substrate may be insufficient. In addition, when an image is recorded on a non-water-absorptive recording medium such as a plastic film by an ink jet method, discharge performance of an ink during recording is also poor.

For example, an ink composition described in the above-described JP-A No. 2013-082916 in which a polymerizable composition is applied to an ink jet method is likely to have a high ink viscosity since a polymer compound contained as a polymer component has an amide structure as well as a branched structure, and it is difficult to stably maintain the discharge performance. In an ink composition described in JP-A No. 2010-001437, since a polymer includes within the molecule a fluorine-substituted hydrocarbon group, a siloxane skeleton, or a long chain alkyl group, the polymer is likely to localize near the surface of the ink composition, and as a result, adhesion with the recording medium becomes insufficient, which is problematic.

A further improvement of the film strength of a recorded ink image is also demanded.

Accordingly, establishment of a technique for realizing formation of a cured film in which the film strength is favorable and the adhesion to a substrate is improved is desired. When a polymerizable composition is applied to an ink-jet method, it is important that the discharge performance of an ink for ink-jet recording is excellent.

The present invention has been made in view of the above. One aspect of the present invention addresses provision of a polymerizable composition which exhibits excellent adhesion to a substrate and is capable of forming a cured film having a favorable strength, an ink composition for ink-jet recording and a method of ink-jet recording which exhibit a favorable discharge stability and is capable of recording an image having excellent film strength and excellent adhesion to a recording medium, and a printed article provided with an image which has excellent film strength and excellent adhesion to a recording medium.

Solution to Problem

The present invention includes the following aspects.

<1> A polymerizable composition including: a polymer compound containing at least one of a repeating unit represented by the following Formula (1) or a repeating unit represented by the following Formula (2); a polymerization initiator; and a polymerizable compound.

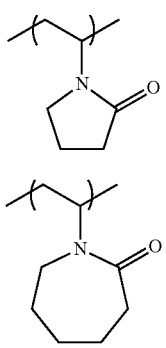

Formula (1)

Formula (2)

<2> The polymerizable composition according to <1>, wherein the polymer compound is a branched polymer compound including: a skeleton structure derived from a multifunctional thiol that is from trifunctional to hexafunctional; and a plurality of polymer chains that include at least one of the repeating unit represented by Formula (1) or the repeating unit represented by Formula (2) and that are connected to the skeleton structure via a sulfide bond.

<3> The polymerizable composition according to <2>, wherein the multifunctional thiol is a hexafunctional thiol.

<4> The polymerizable composition according to <2> or <3>, wherein the multifunctional thiol is at least one selected from dipentaerythritol hexakis(3-mercaptopropionate), dipentaerythritol hexakis(2-mercaptoacetate), or dipentaerythritol hexakis(2-mercaptopropionate).

<5> The polymerizable composition according to any one of <2> to <4>, wherein the polymer chains of the polymer compound further include a repeating unit derived from at least one of 2-phenoxyethyl acrylate, 2-(2-ethoxyethoxy) ethyl acrylate, or isobornyl acrylate.

<6> The polymerizable composition according to any one of <2> to <5>, wherein each of the plurality of polymer chains further includes a (meth)acrylic repeating unit selected from the group consisting of a repeating unit derived from a (meth)acrylate having a $C_{1-8}$ linear hydrocarbon group which may include an oxygen atom, a $C_{3-8}$ branched hydrocarbon group which may include an oxygen atom, a $C_{3-8}$ alicyclic hydrocarbon group which may include an oxygen atom, or a $C_{6-8}$ aromatic hydrocarbon group which may include an oxygen atom; a repeating unit derived from a (meth)acrylate having a $C_{9-10}$ alicyclic hydrocarbon group; and a repeating unit derived from (meth)acrylic acid.

<7> The polymerizable composition according to any one of <1> to <6>, wherein a total content of the repeating unit represented by Formula (1) and the repeating unit represented by Formula (2) in the polymer compound is 40 mol % or higher with respect to a total amount of repeating units of the polymer compound.

<8> The polymerizable composition according to any one of <1> to <7>, wherein the weight-average molecular weight of the polymer compound is from 1,000 to 30,000.

<9> The polymerizable composition according to any one of <1> to <8>, wherein the polymerizable compound includes at least one monofunctional polymerizable compound.

<10> The polymerizable composition according to any one of <1> to <9>, wherein the polymerizable compound includes at least one of N-vinylcaprolactam, 2-phenoxyethyl acrylate, cyclic trimethylol propane formal acrylate, isobornyl acrylate, tetrahydrofurfuryl acrylate, 2-(2-ethoxyethoxy) ethyl acrylate, 2-(2-vinyloxyethoxy) ethyl acrylate, octyl acrylate, decyl acrylate, tridecyl acrylate, isodecyl acrylate, lauryl acrylate, 3,3,5-trimethylcyclohexyl acrylate, or 4-t-butylcyclohexyl acrylate.

<11> The polymerizable composition according to any one of <1> to <10>, wherein the polymerizable compound includes at least one multifunctional polymerizable compound.

<12> The polymerizable composition according to any one of <1> to <11>, wherein the polymerization initiator includes at least one of an α-aminoketone compound or an acylphosphine oxide compound.

<13> An ink composition for ink-jet recording, including the polymerizable composition according to any one of <1> to <12>.

<14> A method of ink-jet recording, including:
a process of discharging the ink composition for ink-jet recording according to <13> onto a recording medium using an ink-jet recording apparatus; and
a process of irradiating the discharged ink composition for ink-jet recording with an <15> A printed article recorded by the method of ink-jet recording according to <14>.

Advantageous Effects of Invention

According to one embodiment of the present invention, a polymerizable composition which exhibits excellent adhesion to a substrate and is capable of forming a cured film having a favorable strength is provided.

According to one embodiment of the present invention, an ink composition for ink-jet recording and a method of ink-jet recording which exhibit a favorable discharge stability and are suitable for recording an image having an excellent film strength and excellent adhesion to a recording medium are provided.

Further, according to one embodiment of the present invention, a printed article provided with an image whose film strength and adhesion to a recording medium are excellent is provided.

DESCRIPTION OF EMBODIMENTS

Hereafter, a polymerizable composition, an ink composition for ink-jet recording, a method of ink-jet recording, and printed article of the present disclosure will be described in detail.

Herein, the notation "(from) X to Y" representing a numerical value range means a numerical value range including X and Y.

The term "(meth)acrylic" is used intending to include "acrylic" and "methacrylic", and the term "(meth)acrylate" is used intending to include "acrylate" and "methacrylate".

Herein, the number of substances corresponding to each component is not limited to one, and a plurality of the substances corresponding to a given component may be present unless otherwise specified. In cases in which the amount of each component in a composition is herein referred to, when a plurality of materials corresponding to each composition exist in the component, the amount of each component means the total amount of the plurality of the materials.

<Polymerizable Composition>

A polymerizable composition according to the present disclosure includes: a polymer compound (A) containing at least one of a repeating unit represented by Formula (1) or a repeating unit represented by Formula (2) shown below; a polymerization initiator (B); and a polymerizable compound (C).

In addition to the ingredients (A) to (C), the polymerizable composition according to the present disclosure may further contain a colorant (D) and other additives (E) such as a polymerization inhibitor as needed.

By containing the above-described ingredients (A) to (C), the polymerizable composition according to the present disclosure exhibits an effect in terms of forming a cured film having an excellent film strength and excellent adhesion to a substrate.

The action mechanism of the polymerizable composition according to the present disclosure, which exhibits the above-described effect, is not necessarily clear, but is presumed as follows.

The polymerizable composition according to the present disclosure is provided with curability by containing a polymerizable compound and a polymerization initiator, and in addition, enables provision of a cured film having an excellent film strength to a substrate and having improved adhesion to a substrate while minimizing increase in the viscosity of the polymerizable composition, by containing as a polymer component a polymer compound including a specific cyclic amide structure. The details are described below.

In general, a polymer including an amide portion is likely to cause an increase in the viscosity due to hydrogen bonds. However, unlike a polymer including a linear or branched amide portion which is likely to cause increase in the viscosity, the polymer compound according to the present disclosure has a cyclic tertiary amide including a cyclic amide portion having a specific structure derived from N-vinylpyrrolidone or N-vinylcaprolactam, which is thought to reduce the increase in the viscosity caused by hydrogen bonds, thereby maintaining the viscosity low. Such an effect in terms of maintaining the viscosity low is more significantly exhibited in cases in which the polymer compound has a structure having a plurality of polymer chains. In addition, since a polymer compound which is a cyclic tertiary amide including a cyclic amide portion having a specific structure includes a structure having a high polarity, inclusion of such a compound imparts a high polarity to a polymerizable composition, and as a result, the content of dissolved oxygen, which may cause polymerization inhibition, is reduced. By this, an active species which is generated when an energy is applied to a polymerizable composition exhibits functions in a state in which polymerization inhibition due to dissolved oxygen is reduced, whereby polymerization or curing of a polymerizable compound contained in the polymerizable composition proceeds efficiently.

Accordingly, in the present disclosure, when a curable composition contains a polymerizable compound and a polymerization initiator, the film strength of a cured film formed from the composition and adhesion to a substrate are considerably improved, without increase in the viscosity of the composition, by containing, in particular, a cyclic tertiary amide polymer compound including a cyclic amide portion having a specific structure derived from N-vinylpyrrolidone or N-vinylcaprolactam.

When the polymer compound according to the present disclosure includes a three-branched to six-branched skeleton structure derived from a multifunctional thiol and plural polymer chains, not only an action of reducing the viscosity due to the cyclic amide having a specific structure as described above, but also inclusion of a three-branched to six-branched skeleton structure derived from a multifunctional thiol has a considerable effect on reducing the viscosity of the polymerizable composition.

In other words, while inclusion of a polymer compound including plural polymer chains as a polymer component further improves the film strength of a cured film and adhesion to a substrate, the viscosity of the polymerizable composition is not considerably increased.

When a polymer compound in the present disclosure includes a three-branched to six-branched skeleton structure derived from a multifunctional thiol and plural polymer chains, from the viewpoint of further inhibiting increase in the viscosity of a polymerizable composition or insufficient adhesion of an image to a substrate, it is preferable that a polymer chain excepting a repeating unit represented by Formula (1) and a repeating unit represented by Formula (2) does not include an atom other than a carbon atom (C), hydrogen atom (H), and oxygen atom (O) (such as a fluorine atom (F), silicon atom (Si), or nitrogen atom (N)) (in other words, other repeating units forming the polymer chain are formed of C, H, and O). Other repeating units may be, for example, a (meth)acrylic repeating unit.

Particularly when a polymer chain of the molecule does not include a fluorine atom (F) or silicon atom (Si), the polymer compound is less likely to be oriented on the film surface of the composition, whereby it becomes easy to inhibit uneven distribution of the polymer compound in the composition. When the polymer chain of the molecule excepting a repeating unit represented by Formula (1) and a repeating unit represented by Formula (2) does not include a nitrogen atom (N) as an amide or the like, increase in the viscosity of the composition can be more effectively inhibited.

Hereinafter, description will be made with respect to each ingredient included in the polymerizable composition according to the present disclosure.

(A) Polymer Compound

The polymerizable composition according to the present disclosure includes at least one type of a polymer compound (hereinafter, referred to as "a specific resin in the present disclosure" in some cases) including at least one of a repeating unit represented by Formula (1) or a repeating unit represented by Formula (2) below.

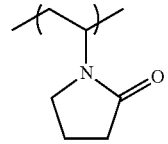

Formula (1)

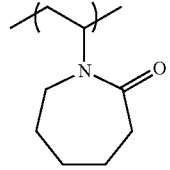

Formula (2)

Since, as represented by Formula (1) or (2), a repeating unit derived from N-vinylpyrrolidone or N-vinylcaprolactam is contained in the molecule, the viscosity of the composition can be kept low even the polymerizable composition includes a polymer component, and a cured film in which the film strength is favorable and adhesion to a substrate is excellent is obtained. Although the action mechanism is not clear, including a repeating unit derived from N-vinylpyrrolidone or N-vinylcaprolactam and including a structure having a high polarity in the molecule impart a high polarity to a polymerizable composition, thereby reducing the amount of dissolved oxygen which may cause polymerization inhibition. Accordingly, polymerization inhibition by an active species which is generated when an energy is applied to a polymerizable composition, caused by dissolved oxygen, is reduced, whereby polymerization curing of a polymerizable compound contained in the polymerizable composition proceeds efficiently.

The specific resin in the present disclosure may be a homopolymer including only one of a repeating unit represented by Formula (1) or a repeating unit represented by Formula (2). The specific resin in the present disclosure may be a copolymer including both a repeating unit represented by Formula (1) and a repeating unit represented by Formula (2), or a copolymer including at least one of a repeating unit represented by Formula (1) or a repeating unit represented by Formula (2), and another repeating unit (for example, a (meth)acrylic repeating unit selected from the group consisting of the repeating units (a) to (c) described below).

From the viewpoint of excellent effect, the specific resin in the present disclosure is preferably a copolymer including at least one of a repeating unit represented by Formula (1) or a repeating unit represented by Formula (2), and another repeating unit (for example, a (meth)acrylic repeating unit selected from the group consisting of the repeating units (a) to (c) described below).

The total content of the repeating unit represented by Formula (1) and the repeating unit represented by Formula (2) is preferably 40 mol % or higher, more preferably in a range of from 40 mol % to 100 mol %, and still more preferably in a range of from 50 mol % to 80 mol % with respect to total repeating units of the polymer compound. When the total content of the repeating unit represented by Formula (1) and the repeating unit represented by Formula (2) is 40 mol % or higher, increase in the viscosity is effectively inhibited, and the film strength upon formation of cured film and adhesion to a substrate are excellent.

—Skeleton Structure Derived from Multifunctional Thiol—

The specific resin in the present disclosure preferably includes a three-branched to six-branched structure derived from a multifunctional thiol. Since the specific resin in the present disclosure includes a branched skeleton structure, increase in the viscosity of the polymerizable composition can be controlled even though the specific resin is a compound of high molecular weight in which a plurality of polymer chains are connected. When the polymerizable composition is discharged by an ink jet method as, for example, an ink composition for ink jet recording, the discharge performance of the ink composition can be stably maintained.

The specific resin in the present disclosure is more preferably, for example, a branched polymer compound including a skeleton structure derived from a trifunctional to hexafunctional multifunctional thiol, and plural polymer chains including at least one of a repeating unit represented by Formula (1) or a repeating unit represented by Formula (2) and connected to the skeleton structure via a sulfide bond (among the plural polymer chains, a polymer chain including at least one of a repeating unit represented by Formula (1) or a repeating unit represented by Formula (2) and connected to the skeleton structure via a sulfide bond is hereinafter also referred to as "a specific polymer chain". In other words, a branched polymer compound including a skeleton structure derived from a trifunctional to hexafunctional multifunctional thiol, and plural polymer chains connected to the skeleton structure via a sulfide bond, wherein at least one of the plural polymer chains includes at least one of a repeating unit represented by Formula (1) or a repeating unit represented by Formula (2), is more preferable.

When the specific resin in the present disclosure is a branched polymer compound including plural polymer chains, the specific resin may have a structure in which all of the plural polymer chains include at least one of a repeating unit represented by Formula (1) or a repeating unit represented by Formula (2), or may have a structure in which some of the plural polymer chains include at least one of a repeating unit represented by Formula (1) or a repeating unit represented by Formula (2) and the remaining polymer chains include neither a repeating unit represented by Formula (1) nor a repeating unit represented by Formula (2).

Among these, an aspect in which all of the plural polymer chains include at least one of a repeating unit represented by Formula (1) or a repeating unit represented by Formula (2) is preferable.

When the multifunctional thiol is trifunctional or higher, an effect in terms of reducing the viscosity due to the branched structure is effectively exhibited, and the film strength upon formation of cured film and adhesion to a substrate can be improved. As described below, a polymerizable composition is advantageously used as an ink composition for ink-jet recording from the viewpoint of more favorably maintaining the discharge stability. A hexafunctional or lower functional thiol is advantageous in that the multifunctional thiol is not only easily available, but also can favorably maintain the discharge stability when the multifunctional thiol is used as an ink composition for ink jet recording.

In one embodiment of the present invention, the multifunctional thiol is preferably a hexafunctional thiol from the viewpoint of an excellent effect in terms of reducing the viscosity due to the branched structure and from the viewpoint of favorably maintaining the discharge stability when used as an ink composition for ink jet recording.

Specific polymer chains bonded to the above-described branched structure via sulfide bond (—S-bond) are entangled with each other to form a network, thereby a low viscosity can be obtained. Preferably, specific polymer chains are bonded to at least two branch ends of the branched structure, and more preferably, specific polymer chains are bonded to all of the branch ends of the branched structure.

Examples of the multifunctional thiol include the following compounds.

(1)
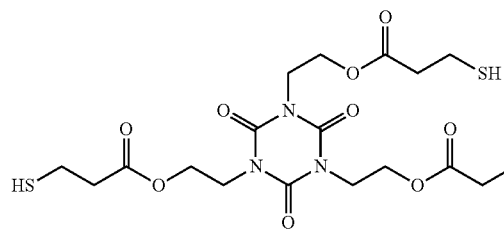

(2)
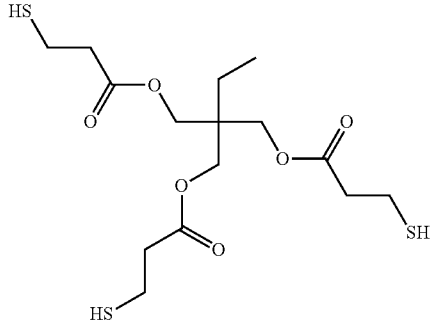

(3)
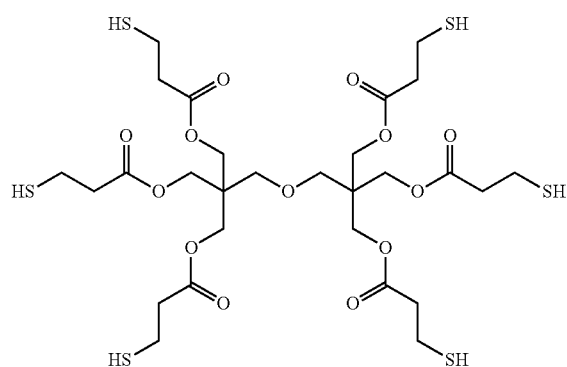

(4)
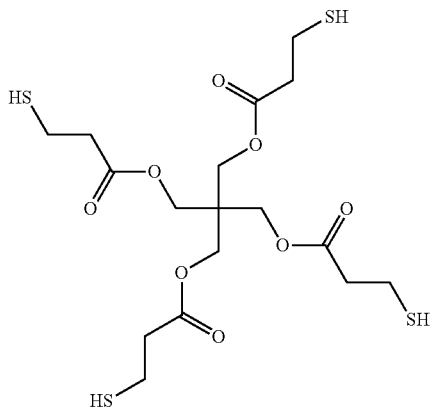

(5)
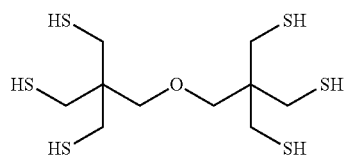

(6)
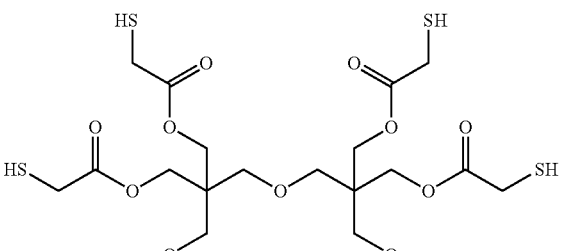

(7)
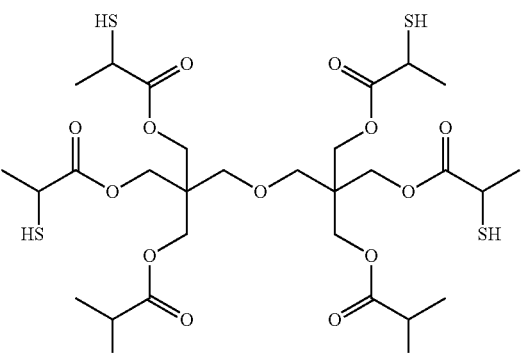

Among the above compounds, a multifunctional thiol selected from the above compound (3) [dipentaerythritol hexakis (3-mercaptopropionate)], compound (6) [dipentaerythritol hexakis (2-mercaptoacetate)], or compound (7) [dipentaerythritol hexakis (2-mercaptopropionate)] is preferable from the viewpoint of an excellent effect in terms of inhibiting increase in the viscosity of a polymerizable composition.

Each polymer chain in the specific resin in the present disclosure preferably further includes, in addition to the above-described repeating units represented by Formula (1) or (2), a (meth)acrylic repeating unit selected from the group consisting of (a) a repeating unit derived from a (meth)acrylate having a $C_{1-8}$ linear hydrocarbon group which may include an oxygen atom, a $C_{3-8}$ branched hydrocarbon group which may include an oxygen atom, a $C_{3-8}$ alicyclic hydrocarbon group which may include an oxygen atom, or a $C_{6-8}$ aromatic hydrocarbon group which may include an oxygen atom (hereinafter, also referred to as "repeating unit (a)"), (b) a repeating unit derived from a (meth)acrylate having $C_{9-10}$ alicyclic hydrocarbon group (hereinafter, also referred to as "repeating unit (b)"), and (c) a repeating unit derived from a (meth)acrylic acid (hereinafter, also referred to as "repeating unit (c)").

At least one type of the (meth)acrylic repeating unit may be included, or two or more types of the (meth)acrylic repeating units may be included.

—Repeating Unit (a)—

Among (meth)acrylic repeating units, the repeating unit (a) is a repeating unit formed by copolymerization reaction of a (meth)acrylate having a hydrocarbon group which may include an oxygen atom, and the repeating unit may be linear, branched, alicyclic, or aromatic. The (meth)acrylate including a hydrocarbon group which may include an oxygen atom may have a structure in which a hydrocarbon group which may include an oxygen atom is connected to C(=O) O— in the (meth)acrylic acid ester structure.

A hydrocarbon group of a (meth)acrylate forming the repeating unit (a) may be a hydrocarbon group formed only of a carbon atom (C) and a hydrogen atom (H), or an oxygen atom (O) may be further included in the hydrocarbon group.

Here, the term "hydrocarbon group including an oxygen atom" refers to a group in which a hydrocarbon group and a hydrocarbon group are connected with an oxygen atom disposed therebetween. That a hydrocarbon group includes an oxygen atom means that the hydrocarbon group has a structure in which a hydrocarbon group and a hydrocarbon group are bonded with an oxygen atom placed in between. A $C_{6-8}$ aromatic hydrocarbon group which may include an oxygen atom may be one in which an aromatic ring is connected to another hydrocarbon group via an oxygen atom or without an oxygen atom therebetween, such as a benzyl group or a phenoxyethyl group.

Examples of a $C_{1-8}$ linear hydrocarbon group which may include an oxygen atom, a $C_{3-8}$ branched hydrocarbon group which may include an oxygen atom, a $C_{3-8}$ alicyclic hydrocarbon group which may include an oxygen atom, or a $C_{6-8}$ aromatic hydrocarbon group which may include an oxygen atom include a methyl group, an ethyl group, a propyl group, a t-butyl group, a benzyl group, a methoxyethyl group, an ethoxyethyl group, a phenoxyethyl group, an ethoxyethoxy ethyl group, an ethenyloxy ethoxy ethyl group, a cyclohexyl group, a norbornyl group, an n-octyl group, and a 2-ethylhexyl group.

Among the above, an ethoxyethoxy ethyl group or a phenoxyethyl group is preferable.

That the number of carbon atoms of a hydrocarbon group of a (meth)acrylate forming the repeating unit (a) is eight or smaller means that a hydrocarbon group of a long chain alkyl group or the like is not included. When the number of carbon atoms of a hydrocarbon group is eight or smaller, the film strength upon formation of a cured film and adhesion to a substrate are improved. When the polymerizable composition is used as an ink composition for ink jet recording, an excellent discharge stability can be attained.

Although depending also on the number of carbon atoms of a hydrocarbon group of another (meth)acrylate forming a (meth)acrylic repeating unit other than the repeating unit (a), the number of carbon atoms of a hydrocarbon group in the repeating unit (a) is preferably in a range of from 6 to 8 from the same viewpoint as mentioned above.

Specific examples of the repeating unit derived from a (meth)acrylate having a $C_{1-8}$ linear hydrocarbon group which may include an oxygen atom, a $C_{3-8}$ branched hydrocarbon group which may include an oxygen atom, a $C_{3-8}$ alicyclic hydrocarbon group which may include an oxygen atom, or a $C_{6-8}$ aromatic hydrocarbon group which may include an oxygen atom include, among repeating units listed in Tables 1 to 6 below as "other repeating units", a repeating unit corresponding to the repeating unit derived from a (meth)acrylate having a $C_{1-8}$ linear hydrocarbon group which may include an oxygen atom, a $C_{3-8}$ branched hydrocarbon group which may include an oxygen atom, a $C_{3-8}$ alicyclic hydrocarbon group which may include an oxygen atom, or a $C_{6-8}$ aromatic hydrocarbon group which may include an oxygen atom; and the following repeating units.

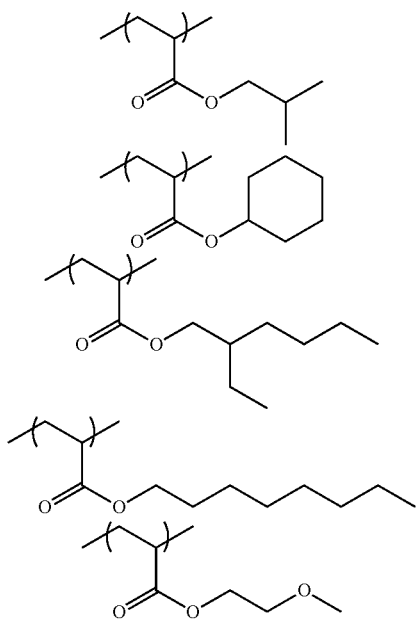

Among the (meth)acrylate having a $C_{1-8}$ linear hydrocarbon group which may include an oxygen atom, $C_{3-8}$ branched hydrocarbon group which may include an oxygen atom, $C_{3-8}$ alicyclic hydrocarbon group which may include an oxygen atom, or $C_{6-8}$ aromatic hydrocarbon group which may include an oxygen atom, 2-phenoxyethyl acrylate, or 2-(2-ethoxyethoxy)ethyl acrylate is preferable from the viewpoint of attaining excellent adhesion of a cured film and the film strength. When a polymerizable composition is used as an ink composition for ink jet recording, the discharge stability can be further improved.

—Repeating Unit (b)—

Among the (meth)acrylic repeating units, the repeating unit (b) is a repeating unit formed by copolymerization reaction of a (meth)acrylate having a $C_{9-10}$ alicyclic hydrocarbon group, and is preferably formed of a carbon atom (C) and a hydrogen atom (H).

Examples of the $C_{9-10}$ alicyclic hydrocarbon group include a monocyclic hydrocarbon group such as a trimethylcyclohexyl group or a t-butyl cyclohexyl group; and a polycyclic hydrocarbon group such as an isobornyl group, an adamantyl group, a dicyclopentanyl group, a dicyclopentenyl group, a tricyclo[5.2.1.0$^{2,6}$] decanyl group, or a bicyclo[4.3.0] nonyl group. The alicyclic hydrocarbon group may further include a substituent, and examples of the substituent include an alkyl group, an alkenyl group, an aryl group, an aralkyl group, an alkoxy group, a hydroxy group, an amino group, an alkyl carbonyl group, an aryl carbonyl group, and a cyano group. The alicyclic hydrocarbon group may further form a condensed ring.

Among (meth)acrylates having a $C_{9-10}$ alicyclic hydrocarbon group, isobornyl acrylate, trimethylcyclohexyl acrylate, and t-butylcyclohexyl acrylate are preferable from the viewpoint that the film strength of a cured film and adhesion to a substrate are excellent. When a polymerizable composition is used for an ink composition for ink jet recording, the discharge stability is also improved.

When the number of carbon atoms of a hydrocarbon group of a (meth)acrylate forming the repeating unit (b) is from 9 to 10, the viscosity of the composition can be kept low. In particular, when the number of carbon atoms of a hydrocarbon group is 10 or less, the film strength of a cured film and adhesion to a substrate are excellent. When a polymerizable composition is used for an ink composition for ink jet recording, deterioration of discharge stability due to increase in the viscosity is advantageously prevented.

Specific example of the repeating unit derived from a (meth)acrylate having a $C_{9-10}$ alicyclic hydrocarbon group include, among repeating units listed in Tables 1 to 6 below as "other repeating units", repeating units corresponding to the repeating unit derived from a (meth)acrylate having a $C_{9-10}$ alicyclic hydrocarbon group of the repeating units.

—Repeating Unit (c)—

Among the (meth)acrylic repeating units, the repeating unit (c) is a repeating unit formed by copolymerization reaction of acrylic acid or methacrylic acid, and is preferably a repeating unit derived from methacrylic acid.

From the viewpoint of inhibiting increase in the viscosity of the ink composition and attaining adhesion of a cured film and film strength, the ink composition preferably includes a repeating unit derived from at least one selected from 2-phenoxyethyl acrylate, 2-(2-ethoxyethoxy)ethyl acrylate, or isobornyl acrylate as a (meth)acrylic repeating unit.

The total amount of at least one (meth)acrylic repeating unit selected from the repeating units (a) to (c) in the polymer chain is preferably in a range 70 mol % or less, more preferably in a range 60 mol % or less, and still more preferably in a range 50 mol % or less with respect to the total repeating units in the polymer chain. The amount of the (meth)acrylic repeating unit is preferably in a range of more than 10 mol %, more preferably 20 mol % or more, and still more preferably 30 mol % or more with respect to the total repeating units in the polymer chain. The total amount of at least one (meth)acrylic repeating unit selected from the repeating units (a) to (c) in the polymer chain is preferably from more than 10 mol % to 70 mol %, more preferably from 20 mol % to 60 mol %, and still more preferably from 30 mol % to 50 mol % with respect to the total repeating units in the polymer chain.

The above-described repeating units (a) to (c) are repeating units derived from (meth)acrylate or (meth)acrylic acid which does not include a long chain hydrocarbon group in which the number of carbon atoms is more than 10, and by containing such repeating units (a) to (c) in a range of 70 mol % or less of the total repeating units, adhesion of a cured film to a substrate can be particularly improved. Particularly when a polymerizable composition is prepared as an ink composition for ink-jet recording, the viscosity of the composition can be stably maintained in an appropriate range for discharging, thereby obtaining excellent discharge stability during recording.

As the at least two (meth)acrylic repeating units in the polymer chain, a (meth)acrylic repeating unit not including an atom other than a carbon atom (C), a hydrogen atom (H), and an oxygen atom (O) (such as a fluorine atom (F), a silicon atom (Si), or a nitrogen atom (N)) is preferable, and a (meth)acrylic repeating unit in which the polymer chain is formed only of C, H, and O is particularly preferable.

In the following, exemplary compounds (polymer P-1 to P-32) of the specific resin are shown. The specific resin of the invention is not limited to these exemplary compounds.

In Tables 1 to 6, "a monomer forming a repeating unit of a polymer chain" is shown in a form of repeating unit.

TABLE 1

| | | Monomer for forming repeating units of the polymer chain [(R)n in the left column] | |
| --- | --- | --- | --- |
| Polymer compound | | Repeating unit represented by Formula (1) or (2) | Other repeating units |
| P-1 | — | Monomer 1 | — — |
| P-2 | — | Monomer 1 | — — |
| P-3 | — | Monomer 1 | — Monomer 2 |

TABLE 1-continued

| Polymer compound | Monomer for forming repeating units of the polymer chain [(R)n in the left column] | |
|---|---|---|
| | Repeating unit represented by Formula (1) or (2) | Other repeating units |
| P-4 — | Monomer 1 (N-vinylpyrrolidone) | Monomer 2 (methyl acrylate) |
| P-5 (trifunctional isocyanurate thiol) Multifunctional thiol = trifunctional | Monomer 1 (N-vinylcaprolactam) | — |
| P-6 (trifunctional isocyanurate thiol) Multifunctional thiol = trifunctional | Monomer 1 (N-vinylpyrrolidone) | — |
| P-7 (trifunctional pentaerythritol-type thiol) Multifunctional thiol = trifunctional | Monomer 1 (N-vinylcaprolactam) | Monomer 2 (N-vinylpyrrolidone) |
| P-8 (trifunctional pentaerythritol-type thiol) Multifunctional thiol = trifunctional | Monomer 1 (N-vinylcaprolactam) | Monomer 2 (methyl acrylate) |

TABLE 2
| Polymer compound | Monomer for forming repeating units of the polymer chain [(R)n in the left column] | |
|---|---|---|
| | Repeating unit represented by Formula (1) or (2) | Other repeating units |
| P-9 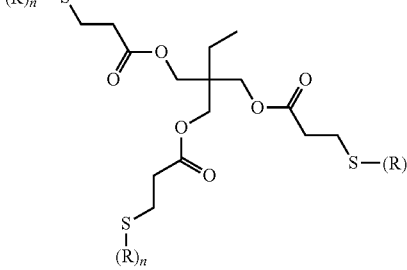 Multifunctional thiol = trifunctional | 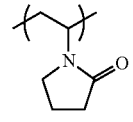 Monomer 1 | 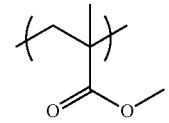 Monomer 2 |
| P-10 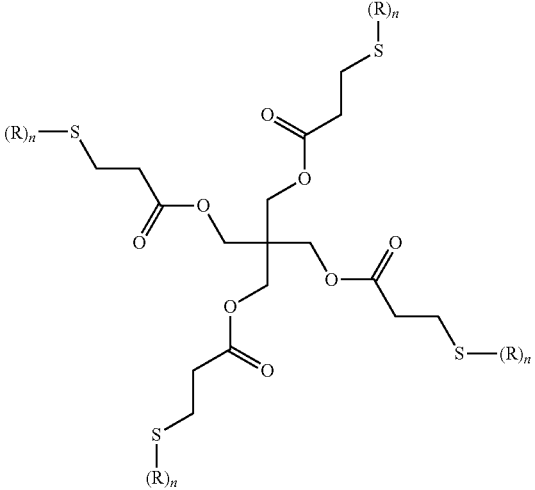 Multifunctional thiol = tetrafunctional | 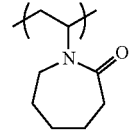 Monomer 1 | 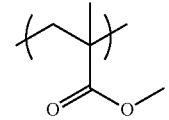 Monomer 2 |
| P-11 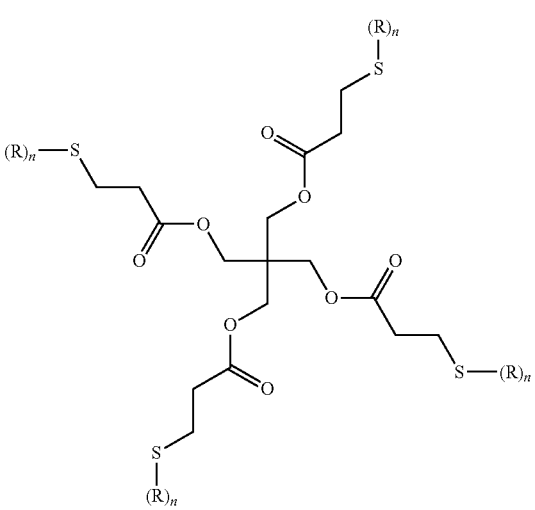 Multifunctional thiol = tetrafunctional | 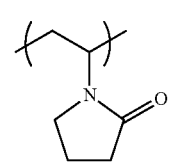 Monomer 1 | 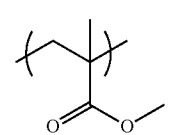 Monomer 2 |

TABLE 2-continued

| Polymer compound | Repeating unit represented by Formula (1) or (2) | Other repeating units |
|---|---|---|
| P-12 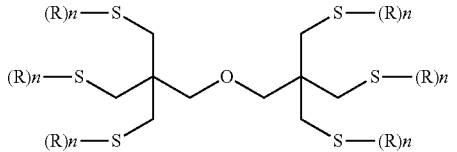 Multifunctional thiol = hexafunctional | 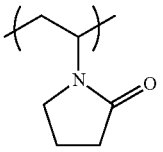 Monomer 1 | — 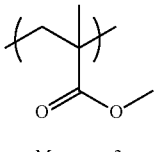 Monomer 2 |
| P-13 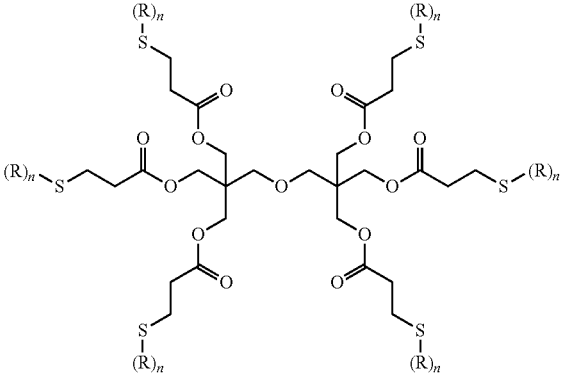 Multifunctional thiol = hexafunctional Dipentaerythritol hexakis(3-mercaptopropionate) | 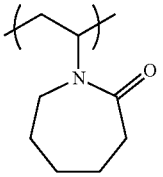 Monomer 1 | — 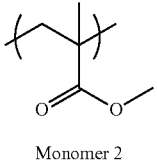 Monomer 2 |

TABLE 3

| Polymer compound | Repeating unit represented by Formula (1) or (2) | Other repeating units |
|---|---|---|
| P-14 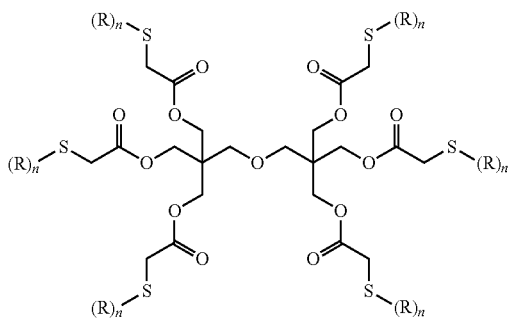 Multifunctional thiol = hexafunctional Dipentaerythritol hexakis(2-mercaptoacetate) | 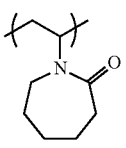 Monomer 1 | — 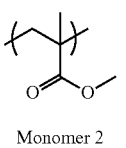 Monomer 2 |

TABLE 3-continued

| | | Monomer for forming repeating units of the polymer chain [(R)n in the left column] | |
|---|---|---|---|
| | Polymer compound | Repeating unit represented by Formula (1) or (2) | Other repeating units |
| P-15 | 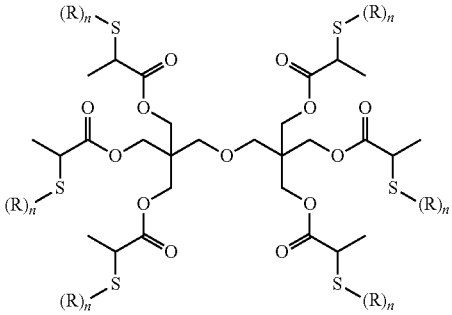<br>Multifunctional thiol = hexafunctional<br>Dipentaerythritol hexakis(2-mercaptopropionate) | 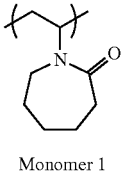<br>Monomer 1 | 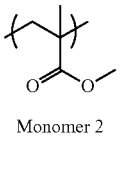<br>Monomer 2 |
| P-16 | 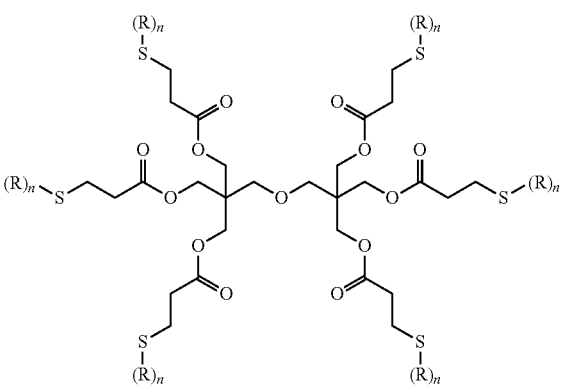<br>Multifunctional thiol = hexafunctional<br>Dipentaerythritol hexakis(2-mercaptopropionate) | 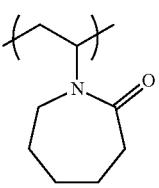<br>Monomer 1 | — |
| P-17 | 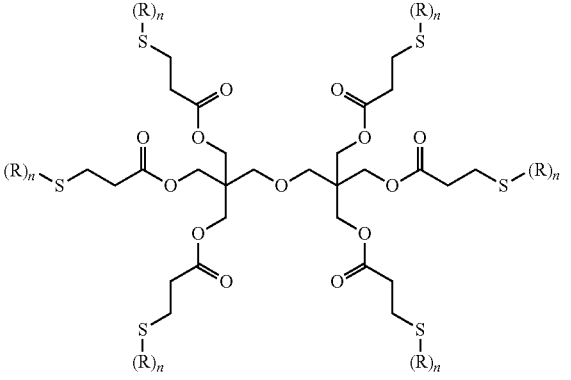<br>Multifunctional thiol = hexafunctional<br>Dipentaerythritol hexakis(3-mercaptopropionate) | 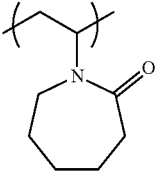<br>Monomer 1 | 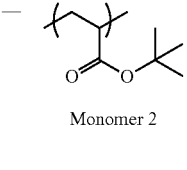<br>Monomer 2 |

TABLE 3-continued

| | Monomer for forming repeating units of the polymer chain [(R)n in the left column] | |
|---|---|---|
| Polymer compound | Repeating unit represented by Formula (1) or (2) | Other repeating units |
| P-18 (hexafunctional thiol structure shown; Multifunctional thiol = hexafunctional Dipentaerythritol hexakis(3-mercaptopropionate)) | Monomer 1 (N-vinylpyrrolidone unit) | Monomer 2 (tert-butyl acrylate unit) |

TABLE 4

| | Monomer for forming repeating units of the polymer chain [(R)n in the left column] | |
|---|---|---|
| Polymer compound | Repeating unit represented by Formula (1) or (2) | Other repeating units |
| P-19 (hexafunctional thiol structure shown; Multifunctional thiol = hexafunctional Dipentaerythritol hexakis(3-mercaptopropionate)) | Monomer 1 (N-vinylcaprolactam unit) | Monomer 2 (tert-butyl acrylate unit) |

TABLE 4-continued

| | | Monomer for forming repeating units of the polymer chain [(R)n in the left column] | | |
|---|---|---|---|---|
| | Polymer compound | Repeating unit represented by Formula (1) or (2) | | Other repeating units |

P-20 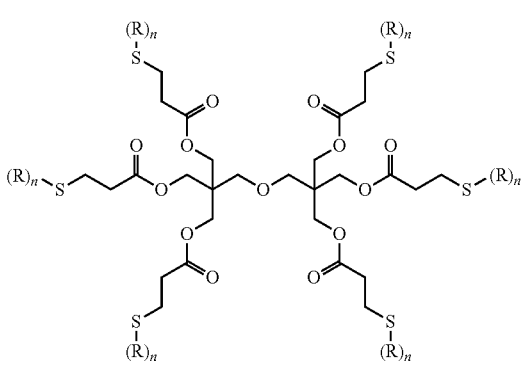

Multifunctional thiol = hexafunctional
Dipentaerythritol hexakis(3-mercaptopropionate)

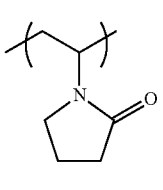
Monomer 1

—

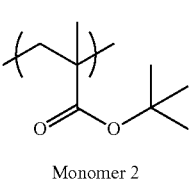
Monomer 2

P-21 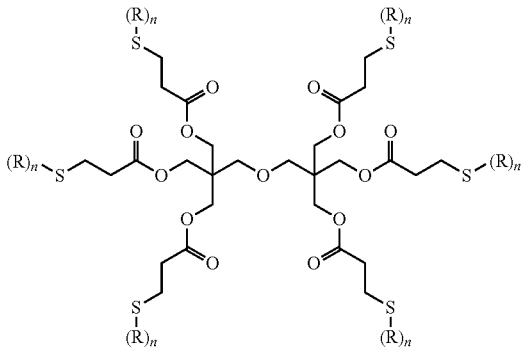

Multifunctional thiol = hexafunctional
Dipentaerythritol hexakis(3-mercaptopropionate)

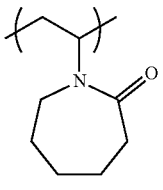
Monomer 1

—

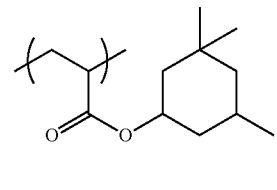
Monomer 2

P-22 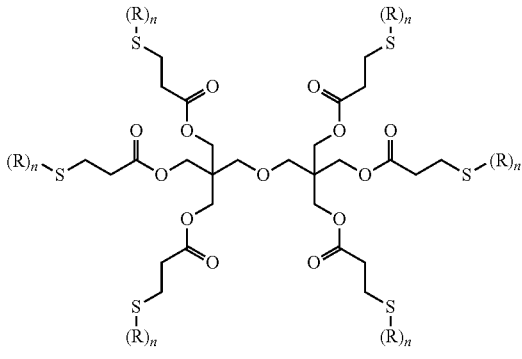

Multifunctional thiol = hexafunctional
Dipentaerythritol hexakis(3-mercaptopropionate)

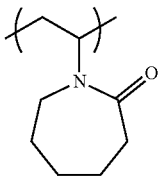
Monomer 1

—

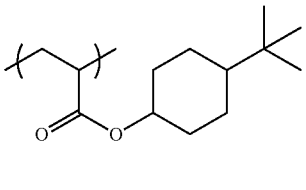
Monomer 2

TABLE 4-continued

| | | Monomer for forming repeating units of the polymer chain [(R)n in the left column] | |
|---|---|---|---|
| Polymer compound | | Repeating unit represented by Formula (1) or (2) | Other repeating units |
| P-23 | <br>Multifunctional thiol = hexafunctional<br>Dipentaerythritol hexakis(3-mercaptopropionate) | <br>Monomer 1 | — <br>Monomer 2 |

TABLE 5

| | | Monomer for forming repeating units of the polymer chain [(R)n in the left column] | |
|---|---|---|---|
| Polymer compound | | Repeating unit represented by Formula (1) or (2) | Other repeating units |
| P-24 | <br>Multifunctional thiol = hexafunctional<br>Dipentaerythritol hexakis(3-mercaptopropionate) | <br>Monomer 1 | — <br>Monomer 2 |
| P-25 | <br>Multifunctional thiol = hexafunctional<br>Dipentaerythritol hexakis(3-mercaptopropionate) | <br>Monomer 1 | — <br>Monomer 2 |

TABLE 5-continued

|  | Monomer for forming repeating units of the polymer chain [(R)n in the left column] | |
|---|---|---|
| Polymer compound | Repeating unit represented by Formula (1) or (2) | Other repeating units |

P-26

Multifunctional thiol = hexafunctional
Dipentaerythritol hexakis(3-mercaptopropionate)

Monomer 1: N-vinylcaprolactam

Monomer 2: benzyl acrylate

P-27

Multifunctional thiol = hexafunctional
Dipentaerythritol hexakis(3-mercaptopropionate)

Monomer 1: N-vinylcaprolactam

Monomer 2: 2-phenoxyethyl acrylate

P-28

Multifunctional thiol = hexafunctional
Dipentaerythritol hexakis(3-mercaptopropionate)

Monomer 1: N-vinylpyrrolidone

Monomer 2: 2-phenoxyethyl acrylate

TABLE 6

| Polymer compound | Monomer for forming repeating units of the polymer chain [(R)n in the left column] | |
|---|---|---|
| | Repeating unit represented by Formula (1) or (2) | Other repeating units |

P-29 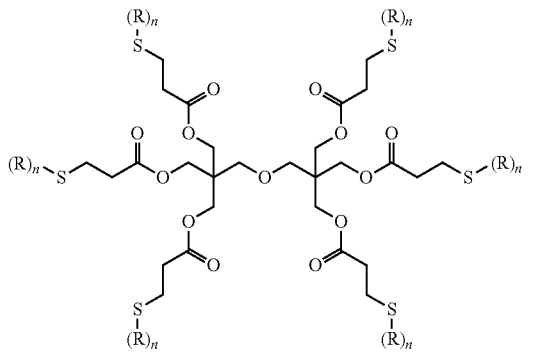

Multifunctional thiol = hexafunctional
Dipentaerythritol hexakis(3-mercaptopropionate)

Monomer 1 — Monomer 2

P-30 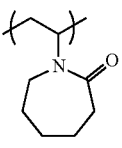

Multifunctional thiol = hexafunctional
Dipentaerythritol hexakis(3-mercaptopropionate)

Monomer 1 — Monomer 2

P-31 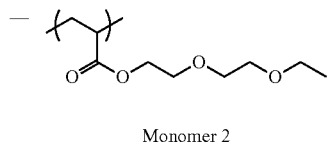

Multifunctional thiol = hexafunctional
Dipentaerythritol hexakis(3-mercaptopropionate)

Monomer 1 — Monomer 2

TABLE 6-continued

| Polymer compound | Monomer for forming repeating units of the polymer chain [(R)n in the left column] | |
|---|---|---|
| | Repeating unit represented by Formula (1) or (2) | Other repeating units |
| P-32 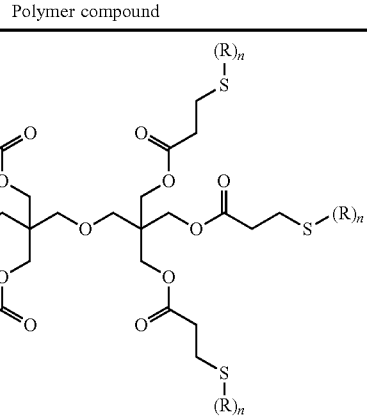 | Monomer 1 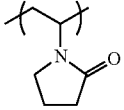 | Monomer 2 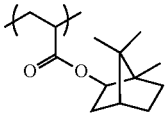 |

Multifunctional thiol = hexafunctional
Dipentaerythritol hexakis(3-mercaptopropionate)

The weight-average molecular weight (Mw) of the specific resin is preferably in a range of from 1,000 to 30,000. When the weight-average molecular weight is 1,000 or more, adhesion of a cured film to a substrate and the film strength of an image are excellent. When the weight-average molecular weight is 30,000 or less, increase in the viscosity of the composition is advantageously prevented, and when an ink composition for ink jet recording is prepared, the discharge performance can be stably maintained.

From the same reason as described above, the weight-average molecular weight of the specific resin is preferably from 1,000 to 10,000, and more preferably from 1,000 to 5,000.

The weight-average molecular weight is measured by gel permeation chromatography (GPC).

GPC is performed using HLC (registered trademark) -8020GPC (manufactured by Tosoh Corporation) with three columns of TSKGEL (registered trademark), SUPERMULTIPOREHZ-H (manufactured by Tosoh Corporation, 4.6 mm ID×15 cm) as columns and THF (tetrahydrofuran) as an eluant. The measurement is performed under conditions of a sample concentration of 0.45% by mass, a flow rate of 0.35 ml/min, a sample injection amount of 10 μl, and a measurement temperature of 40° C. using an RI detector. A calibration curve is created using eight samples of "standard sample, TSK standard, polystyrene": "F-40", "F-20", "F-4", "F-1", "A-5000", "A-2500", "A-1000", and "n-propyl benzene" manufactured by Tosoh Corporation.

The content of the specific resin in a polymerizable composition is preferably from 1% by mass to 15% by mass, and more preferably from 1% by mass to less than 10% by mass with respect to the total mass of the polymerizable composition.

When the content of the specific resin is 1% by mass or more, a cured film in which adhesion to a substrate and the film strength are excellent tends to be obtained while increase in the viscosity of a polymerizable composition is inhibited. When the content of the specific resin is 15% by mass or less, the viscosity of a polymerizable composition can be stably maintained. In cases in which the polymerizable composition is used as an ink composition for ink jet recording, when the content of the specific resin is in the above-described range, the discharge performance can be stably maintained.

(B) Polymerization Initiator

The polymerizable composition according to the present disclosure contains at least one polymerization initiator. The polymerization initiator is a compound which generates a polymerization initiation species which is an active species by irradiation of an active energy radiation, and can be appropriately selected from known photopolymerization initiators and thermal polymerization initiators for use.

The active energy radiation is not particularly restricted as long as it can impart an energy capable of generating an active species in a polymerizable composition by irradiation. Examples of the active energy radiation include an α-ray, a γ-ray, an X-ray, an ultraviolet ray, an infrared ray, a visible ray, and an electron beam. Among these, from the viewpoint of curing sensitivity and availability of a device, an ultraviolet ray or an electron beam is preferable, and an ultraviolet ray is more preferable for the active energy radiation.

The polymerizable composition according to the present disclosure is preferably curable by irradiation of an ultraviolet ray as the active energy radiation.

As the polymerization initiator, a radical polymerization initiator is preferable, and examples thereof include (a) aromatic ketones, (b) acylphosphine oxide compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds including a carbon-halogen bond, (m) α-aminoketone compounds, and (n) alkylamine compounds.

Examples of the radical polymerization initiator include radical polymerization initiators described in paragraphs [0135] to [0208] in JP-A No. 2006-085049.

From the viewpoint of excellent curing sensitivity, as the polymerization initiator, a polymerization initiator selected from the group consisting of (b) an acylphosphine oxide compound, (g) a ketoxime ester compound, (1) a compound including a carbon-halogen bond, and (m) an α-aminoketone compound is preferable, and a polymerization initiator selected from the group consisting of an α-aminoketone compound and an acylphosphine oxide compound is more preferable. Further, as the polymerization initiator, from the viewpoint of curing sensitivity, it is particularly preferable that both an a-aminoketone compound and an acylphosphine oxide compound are contained.

Examples of the acylphosphine oxide compound include compounds described in Japanese Patent Publication (JP-B) No. S63-40799, JP-B No. H5-29234, JP-A No. H10-95788, and JP-A No. H10-29997. As the acylphosphine oxide compound, a commercially available one may be used, and examples of the commercially available acylphosphine oxide compound include IRGACURE (registered trademark) series and DAROCUR (registered trademark) series manufactured by BASF Corporation such as IRGACURE 819, IRGACURE 1800, IRGACURE 1870, or DAROCUR TPO and Lucirin (registered trademark) TPO.

Examples of the ketoxime ester compounds include compounds described in Japanese National-Phase Publication No. 2006-516246, JP-A No. 2001-233842, JP-A No. 2004-534797, JP-A No. 2005-097141, and JP-A No. 2006-342166.

Examples of the compound including a carbon-halogen bond include a triazine compound such as a compound described in JP-A No. H8-269049 or Japanese National-Phase Publication No. 2005-503545 or Non-Patent Document J. Am, Chem. Soc. 1999, 121, p6167 to 6175.

Examples of the α-aminoketone compound include 2-methyl-1-phenyl-2-morpholinopropane-1-one, 2-methyl-1-[4-(hexyl)phenyl]-2-morpholinopropane-1-one, and 2-ethyl-2-dimethylamino-1-(4-morpholinophenyl)-butanone-1.

For the α-aminoketone compound, a commercially available one may be used, and examples of the commercially available α-aminoketone compound include IRGACURE (registered trademark) series (such as IRGACURE 907, 369, or 379) manufactured by BASF Corporation.

When the polymerizable composition according to the present disclosure is used as a white polymerizable composition or a colorless (clear) polymerizable composition, a polymerization initiator having an excellent discoloration resistance is preferably selected. In this case, preferable examples of the α-aminoketone compound include IRGACURE (registered trademark) 907, and preferable examples of the acylphosphine oxide compound include IRGACURE (registered trademark) 819 and DAROCUR (registered trademark) TPO.

For the α-aminoketone compound and the acylphosphine oxide compound, for example, polymerization initiators described in paragraphs [0044] to [0077] in JP-A No. 2010-235697 are preferably applied.

The polymerizable composition according to the present disclosure may contain one single polymerization initiator or may contain two or more of polymerization initiators in combination.

The content of the polymerization initiator in the polymerizable composition is preferably from 0.1% by mass to 30% by mass, more preferably from 1.0% by mass to 20% by mass, and still preferably from 3.0% by mass to 15% by mass with respect to the total mass of the composition.

In the polymerizable composition according to the present disclosure, the content of the polymerization initiator is preferably from 0.01 parts by mass to 35 parts by mass, and more preferably from 0.1 parts by mass to 30 parts by mass with respect to 100 parts by mass of the polymerizable compound below.

(C) Polymerizable Compound

The polymerizable composition according to the present disclosure contains at least one polymerizable compound. The polymerizable compound may be appropriately selected from compounds having in the molecule at least one radically polymerizable ethylenically unsaturated bond. The polymerizable compound may be any of a monomer, an oligomer, or a mixture thereof, and a monomer is preferably used.

Examples of the polymerizable compound include radically polymerizable monomers such as: an unsaturated carboxylic acid such as acrylic acid, methacrylic acid, itaconic acid, crotonic acid, isocrotonic acid, or maleic acid, salts thereof, esterified products thereof, and amide compounds thereof; anhydrides having an ethylenically unsaturated group; acrylonitrile; styrene; unsaturated polyesters; unsaturated polyethers; unsaturated polyamides; and unsaturated urethanes.

Specific examples of the polymerizable compound include: an ester of an unsaturated carboxylic acid and a polyhydric alcohol compound; an amide of an unsaturated carboxylic acid and a multifunctional amine compound; a product of addition reaction between an unsaturated carboxylic acid ester or an amide having a nucleophilic substituent such as a hydroxy group, an amino group, or a mercapto group, and a monofunctional or multifunctional isocyanate compound or epoxy compound; and a product of dehydration condensation between an unsaturated carboxylic acid ester or amide having a nucleophilic substituent, and a monofunctional or multifunctional carboxylic acid.

Other examples of polymerizable compound include: a product of addition reaction between an unsaturated carboxylic acid ester or amide having an electrophilic substituent such as an isocyanate group or an epoxy group, and a monofunctional or multifunctional alcohol, amine, or thiol; and a product of substitution reaction between an unsaturated carboxylic acid ester or amide having a leaving substituent such as a halogen group or a tosyloxy group, and a monofunctional or multifunctional alcohol, amine, or thiol. Other examples of the polymerizable compounds include compounds obtainable by replacing unsaturated carboxylic acids in the above-described compounds by an unsaturated phosphonic acid, styrene, vinyl ether or the like.

Other than the above-described compounds, examples of the polymerizable compound also include polymerizable compounds described in Japanese National-Phase Publication No. 2006-508380, JP-A No. 2002-287344, JP-A No. 2008-256850, JP-A No. 2001-342222, JP-A No. H9-179296, JP-A No. H9-179297, JP-A No. H9-179298, JP-A No. 2004-294935, JP-A No. 2006-243493, JP-A No. 2002-275129, JP-A No. 2003-64130, JP-A No. 2003-280187, and JP-A No. H10-333321.

The polymerizable composition according to the present disclosure may include at least one monofunctional polymerizable compound as the polymerizable compound. The term "monofunctional polymerizable compound" refers to a compound including, in a molecule thereof, only one radically polymerizable ethylenically unsaturated bond.

When the monofunctional polymerizable compound is included, the polymerizable composition has a reduced viscosity and an excellent curability since curing rate by polymerization is high and the monofunctional polymerizable compound also has a function as a solvent for the polymerizable composition. When the polymerizable composition according to the present disclosure does not include a solvent or when the content of the solvent is less than 5% by mass, the viscosity of the polymerizable composition can be maintained low. Since the amount of the solvent can be reduced by containing a monofunctional polymerizable compound, an odor due to volatilization of the solvent is reduced, and further, the amount of ingredients not contributing to curing is reduced, which is advantageous also for improving curability.

Examples of the monofunctional polymerizable compound include: acrylic acid derivatives such as acrylate compounds such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, oligoester acrylate, epoxy acrylate, 2-phenoxyethyl acrylate, cyclic trimethylol propane formal acrylate, isobornyl acrylate, tetrahydrofurfuryl acrylate, 2-(2-ethoxyethoxy)ethyl acrylate, 2-(2-vinyloxyethoxy)ethyl acrylate, octyl acrylate, decyl acrylate, tridecyl acrylate, isodecyl acrylate, lauryl acrylate, 3,3,5-trimethylcyclohexyl acrylate, and 4-t-butylcyclohexyl acrylate, and acrylamide compounds such as N-methylol acrylamide, diacetone acrylamide, and N-hydroxy ethyl acrylamide; methacrylic acid derivatives such as methacrylates such as methyl methacrylate, n-butyl methacrylate, 2-ethylhexyl methacrylate, lauryl methacrylate, allyl methacrylate, glycidyl methacrylate, benzyl methacrylate, and dimethylaminomethyl methacrylate; derivatives of an allyl compounds such as an allyl glycidyl ether; and N-vinylcaprolactam (NVC).

From the viewpoint of excellent curability, the monofunctional polymerizable compound is preferably selected from the group consisting of N-vinylcaprolactam, 2-phenoxyethyl acrylate, cyclic trimethylol propane formal acrylate, isobornyl acrylate, tetrahydrofurfuryl acrylate, 2-(2-ethoxyethoxy) ethyl acrylate, 2-(2-vinyloxyethoxy)ethyl acrylate, octyl acrylate, decyl acrylate, tridecyl acrylate, isodecyl acrylate, lauryl acrylate, 3,3,5-trimethylcyclohexyl acrylate, and 4-t-butylcyclohexyl acrylate.

From the viewpoint of improving the film strength of an image, the polymerizable composition according to the present disclosure preferably contains at least one multifunctional polymerizable compound. The term "multifunctional polymerizable compound" refers to a compound including, in a molecule thereof, at least two radically polymerizable ethylenically unsaturated bonds.

Examples of the multifunctional polymerizable compound include: acrylic acid derivatives such as acrylate compounds such as bis(4-acryloxypolyethoxyphenyl) propane, neopentylglycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, and dipentaerythritol tetraacrylate; methacrylic acid derivatives such as methacrylate compounds such as trimethylol propane trimethacrylate, tetramethylol methane tetramethacrylate, 1,6-hexanediol dimethacrylate, ethylene glycol dimethacrylate, triethylene glycol dimethacrylate, polyethylene glycol dimethacrylate, polypropylene glycol dimethacrylate, trimethylol ethane trimethacrylate, trimethylol propane trimethacrylate, and 2,2-bis(4-methacryloxy polyethoxyphenyl) propane; allyl compound derivatives such as diallyphthalate and triallyl trimellitate; and di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, and trimethylol propane trivinyl ether.

Among others, as the multifunctional polymerizable compound, a multifunctional acrylate having, in a molecule thereof, two or more radically polymerizable ethylenically unsaturated bonds is preferable.

Examples of the multifunctional acrylate include a compound having, in a molecule thereof, two to eight radically polymerizable ethylenically unsaturated bonds, and a compound having two to six radically polymerizable ethylenically unsaturated bonds is preferable.

Specific examples of the multifunctional polymerizable compound include multifunctional (meth)acrylate compounds such as bis(4-(meth)acryloxypolyethoxyphenyl) propane, tripropylene glycol di(meth)acrylate, polyethylene glycol di(meth)acrylate, polypropylene glycol di(meth)acrylate, dipentaerythritol tetra(meth)acrylate, trimethylol propane (propylene oxide (PO) modified) tri(meth)acrylate, oligoester (meth)acrylate, hydroxypivalic acid neopentylglycol di(meth)acrylate, tetramethylol methane tri(meth) acrylate, dimethylol tricyclodecane di(meth)acrylate, modified glycerol tri(meth)acrylate, dipentaerythrytol hexaacrylate, bisphenol A diglycidyl ether(meth)acrylic acid adduct, modified bisphenol A di(meth)acrylate, bisphenol A PO adduct di(meth)acrylate, bisphenol A ethylene oxide (EO) adduct di(meth)acrylate, 3-methyl-L5-pentanediol di(meth)acrylate, dipropylene glycol di(meth)acrylate, trimethylol propane triacrylate, dipentaerythritol hexa(meth) acrylate, propylene glycol diglycidyl ether(meth)acrylic acid adduct, and ditrimethylol propane tetra(meth)acrylate. Examples of the multifunctional polymerizable compound other than the above include allyl compounds such as diallyl phthalate and triallyl trimellitate.

A multifunctional vinyl ether is also suitable as the multifunctional polymerizable compound. Examples of the multifunctional vinyl ether include: divinyl ethers such as ethylene glycol divinyl ether, diethylene glycol divinyl ether, triethylene glycol divinyl ether, polyethylene glycol divinyl ether, propylene glycol divinyl ether, dipropylene glycol divinyl ether, butylene glycol divinyl ether, butanediol divinyl ether, hexanediol divinyl ether, cyclohexane dimethanol divinyl ether, bisphenol A alkylene oxide divinyl ether, and bisphenol F alkylene oxide divinyl ether; and multifunctional vinyl ethers such as trimethylol ethane trivinyl ether, trimethylol propane trivinyl ether, ditrimethylol propane tetravinyl ether, glycerol trivinyl ether, pentaerythritol tetravinyl ether, dipentaerythritol pentavinyl ether, dipentaerythritol hexavinyl ether, ethylene oxide added trimethylol propane trivinyl ether, propylene oxide added trimethylol propane trivinyl ether, ethylene oxide added ditrimethylol propane tetravinyl ether, propylene oxide added ditrimethylol propane tetravinyl ether, ethylene oxide added pentaerythritol tetravinyl ether, propylene oxide added pentaerythritol tetravinyl ether, ethylene oxide added dipentaerythritol hexavinyl ether, and propylene oxide added dipentaerythritol hexavinyl ether. Among the multifunctional vinyl ether compounds, divinyl ether compounds are particularly preferable.

Other than the above-described compounds, examples of the multifunctional polymerizable compound include photocurable polymerizable compounds used for a photopolymerizable composition described in, for example, JP-A No. H7-159983, JP-B No. H7-31399, JP-A No. H8-224982, JP-A No. H10-863, JP-A No. H9-134011, or Japanese National-Phase Publication No. 2004-514014.

As the multifunctional polymerizable compound, a multifunctional acrylate is preferable, and further, from the viewpoint of excellent curability, dipentaerythrytol hexaacrylate, 3-methyl-1,5-pentanediol diacrylate, dipropylene glycol diacrylate, or trimethylol propane triacrylate is preferable.

The polymerizable composition according to the present disclosure may contain either a monofunctional polymerizable compound or a multifunctional polymerizable compound, or may contain both thereof. In particular, the polymerizable composition preferably contains a monofunctional polymerizable compound, from the viewpoint that the viscosity is maintained low, and that, for example in cases in which an ink composition for ink jet recording is prepared, the discharge performance is improved and curability is excellent. Further, the polymerizable composition according to the present disclosure more preferably contains both a monofunctional polymerizable compound and a multifunctional polymerizable compound for similar reasons.

The content of the polymerizable compound in the polymerizable composition according to the present disclosure is preferably from 45% by mass to 90% by mass, more preferably from 50% by mass to 80% by mass, and still more preferably from 60% by mass to 80% by mass with respect to the total mass of the polymerizable composition.

When the polymerizable composition according to the present disclosure contains a monofunctional polymerizable compound, the viscosity can be easily adjusted to a desired range, and the film strength of a cured film and adhesion to a substrate are excellent. When a polymerizable composition is used as an ink composition for ink jet recording, the viscosity of the composition can be easily adjusted to a viscosity suitable for recording an image by discharging the composition by an ink jet method.

When the polymerizable composition contains a multifunctional polymerizable compound, the content of the multifunctional polymerizable compound is preferably 20% by mass or lower, and more preferably 10% by mass or lower with respect to the total amount of the polymerizable compound. The lower limit of the content of the multifunctional polymerizable compound is not particularly restricted, and all polymerizable compounds contained in the polymerizable composition may be a monofunctional polymerizable compound.

In order to improve the film strength of an image by including a multifunctional polymerizable compound, the content of the multifunctional polymerizable compound is preferably 5% by mass or higher with respect to the total amount of the polymerizable compound.

The content of the multifunctional polymerizable compound is preferably from 5% by mass to 20% by mass, and more preferably from 5% by mass to 10% by mass with respect to the total mass of the polymerizable compound.

(D) Colorant

The polymerizable composition according to the present disclosure may contain at least one colorant. By containing a colorant, a colored polymerizable composition is obtained, thereby forming a visible image.

The colorant is not particularly restricted, and a variety of known colorants (pigment, dye) may be appropriately selected depending on applications. For example, in order to form an image having an excellent weather resistance, a pigment is suitable. As a dye, either water-soluble dyes or oil-soluble dyes are applicable, and oil-soluble dyes are preferable.

The polymerizable composition according to the present disclosure does not necessarily need to include a colorant, and may be a colorless and transparent (clear) polymerizable composition not including a colorant.

(Pigment)

The pigment is not particularly limited, and may be either an organic pigment or an inorganic pigment. A dispersion pigment in which a pigment is dispersed in an insoluble resin or the like used as a dispersion medium, a surface-treated pigment in which a resin is formed by graft polymerization on the surface of a pigment, or the like may be used. An organic resin pigment which is obtained by dying a resin particle with a dye or the like can also be used.

Examples of the pigment include pigments described in Seishiro Ito, ed., "Dictionary of Pigments" (published in 2000), W. Herbst, K. Hunger "Industrial Organic Pigments", JP-A No. 2002-12607, JP-A No. 2002-188025, JP-A No. 2003-26978, and JP-A No. 2003-342503.

Specific examples of organic pigments and inorganic pigments include, as yellow pigments: monoazo pigments such as C.I. Pigment Yellow 1 (First Yellow G or the like) or C.I. Pigment Yellow 74; disazo pigments such as C.I. Pigment Yellow 12 (Disazo Yellow AAA or the like) or C.I. Pigment Yellow 17; non-benzine-based azo pigments such as C.I. Pigment Yellow 180; azo lake pigments such as C.I. Pigment Yellow 100 (Tartrazine Yellow Lake or the like); condensed azo pigments such as C.I. Pigment Yellow 95 (Condensed Azo Yellow GR or the like); acidic dye lake pigment such as C.I. Pigment Yellow 115 (Quinoline Yellow Lake or the like); basic dye lake pigment such as C.I. Pigment Yellow 18 (Thioflavin Lake or the like); anthraquinone pigments such as Flavanthrone Yellow (Y-24); isoindolinone pigments such as Isoindolinone Yellow 3RLT (Y-110); quinophthalone pigments such as Quinophthalone Yellow (Y-138); isoindolinone pigments such as Isoindolinone Yellow (Y-139); nitroso pigments such as C.I. Pigment Yellow 153 (Nickel Nitroso Yellow or the like); and metal complex salt-based azomethine pigments such as C.I. Pigment Yellow 117 (Copper Azomethine Yellow or the like).

With respect to specific examples of the pigment, specific examples of red or magenta pigments include: monoazo pigments such as C.I. Pigment Red 3 (Toluidine Red or the like); disazo pigments such as C.I. Pigment Red 38 (Pyrazolone Red B or the like); azo lake pigments such as C.I. Pigment Red 53: 1 (Lake Red C or the like) or C.I. Pigment Red 57: 1 (Brilliant Carmine 6B); condensed azo pigments such as C.I. Pigment Red 144 (Condensed Azo Red BR or the like); acidic dye lake pigments such as C.I. Pigment Red 174 (Phloxine B Lake or the like); basic dye lake pigments such as C.I. Pigment Red 81 (Rhodamine 6G'Lake or the like); anthraquinone pigments such as C.I. Pigment Red 177 (Dianthraquinonyl Red or the like); thioindigo pigments such as C.I. Pigment Red 88 (Thioindigo Bordeaux or the like); perinone pigments such as C.I. Pigment Red 194 (Perinone Red or the like); perylen pigments such as C.I. Pigment Red 149 (Perylen Scarlet or the like); quinacridone pigments such as C.I. Pigment Violet 19 (unsubstituted quinacridone) or C.I. Pigment Red 122 (Quinacridone Magenta or the like); isoindolinone pigments such as C.I. Pigment Red 180 (Isoindolinone Red 2BLT or the like); and alizarin lake pigments such as C.I. Pigment Red 83 (Madder Lake or the like).

Specific examples of blue or cyan pigments include: disazo pigments such as C.I. Pigment Blue 25 (Dianisidine Blue or the like); phthalocyanine pigments such as C.I. Pigment Blue 15: 3, or C.I. Pigment Blue 15 (Phthalocyanine Blue or the like); acidic dye lake pigments such as C.I. Pigment Blue 24 (Peacock Blue Lake or the like); basic dye lake pigments such as C.I. Pigment Blue 1 (Victoria Pure Blue BO Lake or the like); anthraquinone pigments such as C.I. Pigment Blue 60 (Indanthrone Blue or the like); and Alkali Blue pigments such as C.I. Pigment Blue 18 (Alkali Blue V-5: 1).

Specific examples of green pigments include: phthalocyanine pigments such as C.I. Pigment Green 7 (Phthalocyanine Green) or C.I. Pigment Green 36 (Phthalocyanine Green); and azo metal complex pigments such as C.I. Pigment Green 8 (Nitroso Green).

Specific examples of orange pigments include: isoindoline pigments such as C.I. Pigment Orange 66 (Isoindoline Orange); and anthraquinone pigments such as C.I. Pigment Orange 51 (Dichloropyranthrone Orange).

Specific examples of black pigments include carbon black (C.I. Pigment Black 7 or the like), titanium black, and aniline black.

Specific examples of white pigments include: basic lead carbonate ($2PbCO_3Pb (OH)_2$, so-called silver white); zinc oxide (ZnO, so-called zinc white); titanium oxide ($TiO_2$, so-called titanium white); and strontium titanate ($SrTiO_3$, so-called titanium strontium white).

Since titanium oxide has a small specific gravity and a large refractive index, and is chemically and physically stable compared with other white pigments, titanium oxide has a large hinding power and coloring power as a pigment, and further, is excellent in resistance to acids, alkalis, environments, and the like. Therefore, titanium oxide is preferable as a white pigment. White pigments other than the above may be used as needed.

For dispersing a pigment, a disperser can be used, such as a ball mill, a sand mill, an attritor, a roll mill, a jet mill, a homogenizer, a paint shaker, a kneader, an agitator, a Henschel mixer, a colloid mill, an ultrasonic homogenizer, a pearl mill, or a wet jet mill.

When a pigment is dispersed, a dispersant may also be added. Examples of the dispersant include a hydroxyl group-containing carboxylic acid ester, a salt of a long chain polyaminoamide and an acid ester of high molecular weight, a salt of a polycarboxylic acid of high molecular weight, an unsaturated acid ester of high molecular weight, a copolymer of high molecular weight, a modified polyacrylate, an aliphatic multifunctional carboxylic acid, a naphthalenesulfonic acid formalin condensate, a polyoxyethylene alkyl phosphate ester, and pigment derivatives. Commercially available polymeric dispersants such as SOLSPERSE (trade name) series manufactured by Zeneca Inc. are also preferably used.

A dispersion aid may be used, and as the dispersion aid, a synergist in accordance with a variety of pigments can also be used.

The dispersant and dispersion aid are preferably added in an amount of from 1 part by mass to 50 parts by mass with respect to 100 parts by mass of a pigment.

The volume average particle size of the pigment is preferably from 0.02 μm to 0.6 μm, more preferably from 0.02 μm to 0.1 μm, and further preferably from 0.02 μm to 0.07 μm. The volume average particle size of the pigment is a value measured using a laser diffraction/scattering particle size distribution analyzer (LA-920 (trade name), manufactured by HORIBA, Ltd.) with a tripropylene glycol methyl ether as a measurement solvent.

The volume average particle size of the pigment can be adjusted to the above-described ranges by selecting a pigment, a dispersant, and a dispersion medium and adjusting dispersion conditions and filtration conditions. Controlling the particle size can inhibit clogging of head nozzles and can maintain the storage stability, transparency and curing sensitivity of the polymerizable composition.

(Dye)

As dyes, oil-soluble dyes are preferable. Oil-soluble dyes refer to dyes whose solubility to water (mass of pigment which dissolves in 100 g of water) at 25° C. is 1 g or lower, and the solubility is preferably 0.5 g or lower, and further preferably 0.1 g or lower. As the dye, a water-insoluble oil-soluble dye is preferably used.

When a colorant is used, the content of the colorant in the polymerizable composition is preferably from 0.05% by mass to 20% by mass, and more preferably from 0.2% by mass to 10% by mass with respect to the total amount of the polymerizable composition. When an oil-soluble dye is used as a colorant, the content is particularly preferably from 0.2% by mass to 6% by mass with respect to the total amount (including a solvent) of the polymerizable composition.

When the content of the colorant is in the above-described ranges, the color density of an image is favorable, and the curability of the polymerizable composition can be favorably maintained.

(E) Other Additives

The polymerizable composition according to the present disclosure may contain, other than the above-described ingredients, a sensitizer, a cosensitizer, an antioxidant, a polymerization inhibitor, a solvent, water, a surfactant, an ultraviolet absorber, a color fading inhibitor, an electroconductive salt, or other additives as long as effects of the present invention is not compromised.

—Sensitizer—

A sensitizer may be added to the polymerizable composition according to the present disclosure. As the sensitizer, any compound may be used as long as the compound has a sensitizing action to a polymerization initiator by an electron transfer mechanism or an energy transfer mechanism, and a known sensitizer may be appropriately selected.

Examples of a preferred sensitizer include the following compounds having an absorption wavelength in a wavelength region of from 350 nm to 450 nm.

Specific examples of the sensitizer include: polynuclear aromatic compounds such as anthracene, pyrene, perylene, and triphenylene; thioxanthone compounds such as isopropyl thioxanthone; xanthene compounds such as fluorescein, eosine, erythrosine, rhodamine B, and rose bengal; cyanin compound such as thiacarbocyanin and oxacarbocyanin; merocyanine compound such as merocyanine and carbomerocyanine; thiazine compound such as thionine, Methylene Blue, and Toluidine Blue; acridine compound such as acridine orange, chloroflavin, and acriflavin; an anthraquinone compound; a squarylium compound; and coumarin compounds such as 7-diethyl amino-4-methyl coumarin, and from the viewpoint of excellent curability, polynuclear aromatic compounds and thioxanthone compounds are preferable.

Further, a sensitizing dye described in JP-A No. 2008-95086 can also be used.

—Cosensitizer—

The polymerizable composition according to the present disclosure may also contain a cosensitizer. The cosensitizer has an action of further improving the sensitivity to an active energy radiation of a sensitizer, or reducing an inhibition of polymerization of polymerizable compounds due to oxygen.

Examples of the cosensitizer include amines such as compounds described in M. R. Sander et al. "Journal of Polymer Science", volume 10, p 3173 (1972), JP-B No. S44-20189, JP-A No. S51-82102, JP-A No. S52-134692, JP-A No. S59-138205, JP-A No. S60-84305, JP-A No. S62-18537, JP-A No. S64-33104, and Research Disclosure No. 33825, and specific examples the cosensitizer include triethanolamine, p-dimethylamino benzoic acid ethyl ester, p-formyldimethyl aniline, and p-methyl thiodimethyl aniline.

Other examples of cosensitizers include thiol compounds and sulfide compounds, and specific examples of the cosensitizer include thiol compounds described in JP-A No. S53-702, JP-B No. S55-500806, and JP-A No. H5-142772, and disulfide compounds described in JP-A No. S56-75643. Specific examples thereof include 2-mercaptobenzothiazole, 2-mercaptobenzoxazole, 2-mercaptobenzimidazole, 2-mercapto-4 (3H) -quinazoline, and β-mercaptonaphthalene.

Other examples of cosensitizers include amino acid compounds (N-phenylglycine or the like), an organic metal compound (tributyl tin acetate or the like) described in JP-B No. S48-42965, a hydrogen donor described in JP-B No. S55-34414, a sulfur compound (trithiane or the like) described in JP-A No. H6-308727, a phosphorus compound (diethyl phosphite or the like) described in JP-A No. H6-250387, and a Si—H, Ge—H compound described in JP-A No. H8-54735.

—Antioxidant—

The polymerizable composition according to the present disclosure may contain an antioxidant as long as effects of the present invention are not impaired. By including an antioxidant, the stability of the polymerizable composition is improved.

Examples of the antioxidant include compounds described in European Patent Publication No. 223739, European Patent Publication No. 309401, European Patent Publication No. 309402, European Patent Publication No. 310551, European Patent Publication No. 310552, European Patent Publication No. 459416, German Patent Publication No. 3435443, JP-A No. S54-48535, JP-A No. S62-262047, JP-A No. S63-113536, JP-A No. S63-163351, JP-A No. H2-262654, JP-A No. H2-71262, JP-A No. H3-121449, JP-A No. H5-61166, JP-A No. H5-119449, U.S. Pat. No. 4,814,262, or U.S. Pat. No. 4,980,275.

The addition amount thereof is appropriately selected depending on purposes, and is generally approximately from 0.1% by mass to 8% by mass with respect to the total amount of the polymerizable composition.

—Polymerization Inhibitor—

The polymerizable composition according to the present disclosure preferably contains a polymerization inhibitor. By including a polymerization inhibitor, the storage stability to the thermal polymerization of the polymerizable composition is improved.

It is thought that, when a polymerizable composition is used as an ink composition for ink-jet recording, the ink composition is preferably heated to a temperature range of from 40° C. to 80° C. to make the viscosity low, and then discharged by an ink jet recording apparatus. Accordingly, the ink composition is usually discharged after the temperature thereof has been adjusted to the above-described temperature range, and it is preferable that a polymerization inhibitor is added to the polymerizable composition in order to prevent head clogging due to undesired thermal polymerization when heated.

Examples of the polymerization inhibitor include hydroquinone, benzoquinone, p-methoxy phenol, tetramethyl piperidine-1-oxyl (TEMPO), 1-oxyl-2,2,6,6-tetramethyl-4-hydroxypiperidine (TEMPOL), and aluminum-cupferron complex (cupferron Al). For the polymerization inhibitor, a commercially available one may be used, and examples of the polymerization inhibitor include Genorad 16 (trade name; manufactured by Rahn AG).

When the polymerizable composition contains a polymerization inhibitor, the content of the polymerization inhibitor is preferably from 200 ppm to 20,000 ppm with respect to the total amount of the polymerizable composition.

—Organic Solvent—

The polymerizable composition according to the present disclosure may contain an organic solvent. By including an organic solvent, adhesion of a cured film to a substrate can be improved.

Examples of the organic solvent include a ketone such as acetone, methyl ethyl ketone, or diethyl ketone; an alcohol such as methanol, ethanol, 2-propanol, 1-propanol, 1-butanol, or tent-butanol; a chlorine-based solvent such as chloroform or methylene chloride; an aromatic solvent such as benzene or toluene; an ester solvent such as ethyl acetate, butyl acetate, or isopropyl acetate; an ether solvent such as diethyl ether, tetrahydrofuran, or dioxane; and a glycol ether solvent such as ethylene glycol monomethyl ether or ethylene glycol dimethyl ether.

When an organic solvent is used, it is effective that the organic solvent is added to a degree at which the solvent resistance of a substrate is not deteriorated and an odor or the like is not generated during discharging or curing. Accordingly, the content of the organic solvent is preferably 5% by mass or lower, more preferably from 0.01% by mass to 5% by mass, and further preferably from 0.01% by mass to 3% by mass with respect to the total amount of the polymerizable composition.

—Water—

The polymerizable composition according to the present disclosure may contain water as long as effects of the present disclosure are not impaired.

The polymerizable composition according to the present disclosure is preferably prepared as a non-water-based composition substantially devoid of water. Specifically, the content of water in the polymerizable composition is preferably 3% by mass or lower, more preferably 2% by mass or lower, and most preferably 1% by mass or lower with respect to the total amount of the polymerizable composition.

—Surfactant—

A surfactant may be included to the polymerizable composition according to the present disclosure.

Examples of the surfactant include surfactants described in JP-A No. S62-173463 and JP-A No. S62-183457. Examples of the surfactant include: an anionic surfactant such as a dialkyl sulfosuccinate, an alkyl naphthalene sulfonate or a fatty acid salt; a nonionic surfactant such as a polyoxyethylene alkyl ether, a polyoxyethylene alkylallyl ether, acetylene glycol, or a polyoxyethylene-polyoxypropylene block copolymer; and a cationic surfactant such as an alkylamine salt, or a quaternary ammonium salt.

In place of such surfactants, an organic fluoro compound not having a polymerizable group may be used. The organic fluoro compound is preferably hydrophobic. Examples of the organic fluoro compound include a fluorine-containing surfactant, an oily fluorine-containing compound (fluorine oil or the like) and a solid fluorine compound resin (a tetrafluoroethylene resin or the like), and a compound described in JP-B No. S57-9053 (8th to 17th column) or JP-A No. S62-135826.

—Ultraviolet Absorber—

The polymerizable composition according to the present invention may contain an ultraviolet absorber as long as effects of the present disclosure are not impaired. By containing an ultraviolet absorber, effects such as improving weather resistance and preventing color fading of an obtained image are expected.

Examples of the ultraviolet absorber include: a benzotriazole compound described in JP-A No. S58-185677, JP-A No. S61-190537, JP-A No. H2-782, JP-A No. H5-197075, JP-A No. H9-34057 or the like; a benzophenone compound described in JP-A No. S46-2784, JP-A No. H5-194483, U.S. Pat. No. 3,214,463 or the like; a cinnamic acid compound described in JP-B No. S48-30492, JP-B No. S56-21141, JP-A No. H10-88106 or the like; a triazine compound described in JP-A No. H4-298503, JP-A No. H8-53427, JP-A No. H8-239368, JP-A No. H10-182621, Japanese National-Phase Publication No. H8-501291 or the like; a compound described in Research Disclosure No. 24239; and a compound that absorbs an ultraviolet ray to emit fluorescence, a so-called fluorescent brightening agen, typified by stilbene or a benzoxazole compound.

The content of the surfactant can be appropriately selected depending on purposes, and generally the content is preferably from 0.5% by mass to 15% by mass with respect to the total amount of the polymerizable composition.

—Color Fading Inhibitor—

As the polymerizable composition according to the present disclosure, a color fading inhibitor selected from a variety of organic compounds and metal complex compounds may be used. Examples of the fading inhibitor which is an organic compound include a hydroquinone compound, an alkoxyphenol compound, a dialkoxyphenol compound, a phenol compound, an aniline compound, an amine compound, an indane compound, a chroman compound, an alkoxyaniline compound, and a heterocyclic compound. Examples of the fading inhibitor which is a metal complex compound include a nickel complex and a zinc complex, and specific examples of the fading inhibitor include a compound described in Patent cited in Research Disclosure No. 17643, section VII, items I to J, Research Disclosure No. 15162, Research Disclosure No. 18716, p 650, left column, Research Disclosure No. 36544, p 527, Research Disclosure No. 307105, p 8'72, or Research Disclosure No. 15162 and a compound encompassed by general formula of a representative compound or compound examples described in p 127 to p 137 of JP-A No. S62-215272.

The content of the fading inhibitor is appropriately selected depending on purposes, and generally the content is approximately from 0.1% by mass to 8% by mass with respect to the total amount of the polymerizable composition.

—Electroconductive Salt—

An electroconductive salt such as potassium thiocyanate, lithium nitrate, ammonium thiocyanate, or dimethylamine hydrochloride may be added to the polymerizable composition according to the present disclosure. By the addition of an electroconductive salt, discharge properties can be controlled.

—Other Additives—

The polymerizable composition according to the present disclosure may contain as needed, for example, a known additive such as a leveling agent, a matting agent, a wax for adjusting film physical properties, or a tackifier which does not inhibit polymerization. By using a known additive such as a tackifier, adhesion to a substrate (recording medium) such as polyolefin or polyester (polyethylene terephthalate (PET) can be improved.

Examples of the tackifier include an adhesive polymer of high molecular weight described in p 5 to 6 of JP-A No. 2001-49200 (such as a copolymer formed of an ester of a (meth)acrylic acid and an alcohol having a $C_{1-20}$ alkyl group, an ester of a (meth)acrylic acid and a $C_{3-14}$ alicyclic alcohol, and an ester of a (meth)acrylic acid and a $C_{6-14}$ aromatic alcohol) and a tackifying resin of low molecular weight including a polymerizable unsaturated bond.

The polymerizable composition according to the present disclosure is cured with high sensitivity by application of an energy, and a cured film formed from the composition has a favorable film strength and adhesion of the film to a substrate is excellent, and therefore, the composition is suitably applied to various applications such as a coating agent, an adhesive, paint, or an ink composition. Among others, the polymerizable composition according to the present disclosure is preferably applied to the ink composition for ink-jet recording described below.

—Substrate—

The substrate on which the polymerizable composition according to the present disclosure is applied is not particularly restricted, and various substrates may be appropriately selected depending on a manner of use of the polymerizable composition.

Examples of a substrate which is usable include an organic substrate such as paper, wood, non-absorptive resin material, or a resin film obtained by molding a resin material in a film shape; and an inorganic substrate such as ceramic, metal, or glass.

Examples of the resin film include a polyethylene terephthalate (PET) film, a biaxially oriented polystyrene (OPS) film, a biaxially oriented polypropylene (OPP) film, a biaxially oriented polyamide (ONy) film, a polyvinyl chloride (PVC) film, a polyethylene (PE) film, a triacetylcellulose (TAC) film, polycarbonate (PC) film, and an acrylic resin film.

The substrate may be a substrate having a multi-layer structure, such as a substrate composed of a paper or metal sheet and a resin layer provided thereon, or a substrate composed of a resin film and a metal layer provided on a surface of the resin film.

Details of the substrate in a case in which the polymerizable composition according to the present disclosure is applied to an ink composition for ink-jet recording, that is, a recording medium, are described below.

As a light source generating an ultraviolet ray which is suitably used for imparting an energy, a light source having an emission wavelength at from 300 nm to 400 nm is preferable, and a known ultraviolet ray lamp such as a low-pressure mercury lamp, a high-pressure mercury lamp, a short arc discharge lamp, an ultraviolet ray emitting diode, a semiconductor laser, or a fluorescent lamp can be used. In view of the amount of light or a wavelength appropriate for an initiator, a high-pressure mercury lamp or a metal halide lamp belonging to a high-pressure discharge lamp, or a xenon lamp belonging to a short arc discharge lamp is preferably used.

From the viewpoint of saving energy, an ultraviolet ray emitting diode is also preferably used.

<Ink Composition for Ink-Jet Recording>

An ink composition for ink jet recording according to the present disclosure (hereinafter, also simply referred to as an "ink composition") at least contains the above-described ingredients (A) to (C), and preferably further contains a colorant (D), and may contain other additives (E) as needed.

When the ink composition according to the present disclosure contains at least one colorant, a colored ink composition is obtained and a visible image can be formed. Details of the colorant are as described above. The ink composition according to the present disclosure does not necessarily include a colorant, and may be used as a colorless and transparent (clear) ink composition not containing a colorant.

Since the ink composition according to the present disclosure contains the above-described ingredients (A) to (C), an excellent discharge stability is exhibited and an effect in terms of forming an image having an excellent film strength and adhesion to a recording medium is attained. Although the mechanism by which the ink composition according to the present disclosure exhibits the above-described effect is not entirely clear, the mechanism is, as described above, presumed as follows.

The ink composition according to the present disclosure is imparted with curability by containing a polymerizable compound and a polymerization initiator. In addition, adhesion of an image having an excellent film strength to a recording medium is improved while the viscosity of the ink composition is maintained low, due to inclusion of a polymer compound including a cyclic amide portion having a specific structure as a polymer component. The details are described below.

Unlike a polymer including a linear or branched amide portion which is likely to cause increase in the viscosity, the polymer compound according to the present disclosure has a cyclic tertiary amide including a cyclic amide portion having a specific structure derived from N-vinylpyrrolidone or N-vinylcaprolactam which is thought to reduce the increase in the viscosity caused by a hydrogen bond, thereby maintaining the viscosity low. Such an effect in terms of maintaining the viscosity low is more significantly exhibited in cases in which the polymer compound has a structure having a plurality of polymer chains.

In the present disclosure, when a curable ink composition containing a polymerizable compound and a polymerization initiator is prepared, the viscosity of the ink can be kept low by containing, in particular, a cyclic tertiary amide polymer compound including a cyclic amide portion having a specific structure derived from N-vinylpyrrolidone or N-vinylcaprolactam.

By this, the ink composition according to the present disclosure has an excellent discharge stability during recording, and an image whose film strength and adhesion to a recording medium are excellent can be obtained.

—Physical Properties of Ink Composition—

The viscosity of the ink composition according to the present disclosure at 25° C. is preferably in a range of from 10 mPa·s to 50 mPa·s, and more preferably in a range of from 10 mPa·s to 30 mPa·s. The viscosity of the ink composition can be controlled by adjusting the composition and the content ratio of the ink composition.

When the viscosity of the ink composition is in the above-described range, discharging by an ink jet recording apparatus can be favorably performed.

The viscosity of the ink composition is a value measured using an RE-85L (trade name; manufactured by Toki Sangyo Co., Ltd.) at 25° C.

The surface tension of the ink composition according to the present disclosure is preferably from 20 mN/m to 30 mN/m, and more preferably from 23 mN/m to 28 mN/m. In cases in which recording is performed on a variety of recording media such as a polyolefin substrate, a polyester substrate (for example, polyethylene terephthalate (PET) sheet), a coated paper, or a non-coated paper, a surface tension of 20 mN/m or higher is advantageous in terms of bleeding of a deposited ink composition and easy penetration to a medium, and a surface tension of 30 mN/m or lower is advantageous in terms of the wettability.

The surface tension is a value measured using a surface tensiometer DY-700 (trade name; manufactured by Kyowa Interface Science Co., LTD.) at a temperature of 30° C.

The ink composition for ink-jet recording according to the present disclosure can be prepared by mixing the above-described ingredients (A) to (C), colorant (D), and other additives.

<Method of Ink-Jet Recording>

The method of ink-jet recording according to the present disclosure includes: a process of discharging the above-described ink composition for ink-jet recording according to the present disclosure to a recording medium using an ink-jet recording apparatus (hereinafter, also referred to as "an ink discharge process"); and a process of irradiating discharged ink composition with an active energy radiation, thereby curing the ink composition (hereinafter, also referred to as "a curing process").

The method of ink-jet recording according to the present disclosure employs the ink composition according to the present disclosure, and as a result, an image having an excellent film strength and excellent adhesion to a recording medium can be obtained while discharge performance is stably maintained.

—Ink Discharge Process—

In the ink discharge process, the above-described ink composition for ink-jet recording according to the present disclosure is discharged onto a recording medium.

In this process, it is preferable that the ink composition is heated to a temperature from 25° C. to 80° C. to adjust the viscosity of the ink composition to be from 3 mPa·s to 15 mPa·s (preferably from 3 to 13 mPa·s), and that the ink composition is thereafter discharged. By adjusting the viscosity, the discharge stability can be improved.

Variation in the viscosity of the ink composition largely influences changes in droplet size and changes in discharge speed. Therefore, the temperature of the ink composition during discharging is preferably maintained as constant as possible. From this viewpoint, the temperature of the ink composition is preferably controlled within a range of from a set temperature −5° C. to a set temperature+5° C., and more preferably from a set temperature −2° C. to a set temperature+2° C., and further preferably from a set temperature −1° C. to a set temperature+1° C.

The ink composition is used for forming an image by being discharged from an ink-jet head. The type of the ink-jet head for discharging the ink composition is not particularly restricted, and the ink-jet head is preferably an ink-jet head having a nozzle plate in which nozzle holes are two-dimensionally arranged and the surface on the ink discharging side has been processed to have affinity for ink.

The ink jet recording apparatus and an ink jet head mounted thereon is described below in detail.

—Curing Process—

After the ink discharge process, the ink composition discharged in the ink discharge process is irradiated with an active energy radiation and cured. The ink composition is thus cured, and an image having an excellent film strength and excellent adhesion to a recording medium can be obtained.

By irradiation of an active energy radiation, an energy required for curing reaction is imparted to the ink composition that has been applied to a recording medium. Examples of the active energy radiation include α-ray, γ-ray, X-ray, ultraviolet ray, infrared ray, visible ray, and electron beam. Among these, from the viewpoint of curing sensitivity and availability of the device, the active energy radiation is preferably an ultraviolet ray or electron beam, and more preferably an ultraviolet ray having a peak wavelength in a range from 340 nm to 400 nm.

From the viewpoint of small-size, long life, high efficiency and low cost, examples of a favorable light source for irradiation of an ultraviolet ray include a mercury lamp, a gas laser, a solid state laser, a GaN-based semiconductor ultraviolet light emitting device, a light emitting diode (LED), and a laser diode (LD). In particular, examples of a favorable light source for irradiation of an ultraviolet ray include ultraviolet LED (UV-LED) and ultraviolet LD (UV-LD) including an UV-LED manufactured by NICHIA CORPORATION whose main emission spectrum has a wavelength between 365 nm and 420 nm. When a light having a shorter wavelength is used for exposure, an LED which can emit an active energy radiation centered between 300 nm and 370 nm described in U.S. Pat. No. 6,084,250 or the like can be applied.

Among others, a light source capable of irradiating an active energy radiation is preferably a UV-LED, and most preferably a UV-LED having a peak wavelength in a range from 340 nm to 400 nm.

The ink composition according to the present disclosure can be cured with a high sensitivity even with an active energy radiation at a low output, and an image having an excellent film strength can be obtained. The illuminance of the active energy radiation for irradiation is preferably from 10 mW/cm$^2$ to 4,000 mW/cm$^2$, and more preferably from 20 mW/cm$^2$ to 2,500 mW/cm$^2$.

The irradiation method may be a method disclosed in JP-A No. S60-132767. Specifically, a light source is provided on both sides of a head unit, and the head and light sources are moved in a scanning manner using a shuttle method. Irradiation is performed for a certain time period after the ink is deposited. Further, curing is completed using another light source that is non-driven. WO99/54415 discloses, as irradiation methods, a method using an optical fiber, and a method in which a collimated light from a light source is directed to a mirror face provided on the side of a head unit, thereby irradiating the deposited ink composition with an ultraviolet ray.

When an image is recorded by an ink jet recording apparatus using the ink composition according to the present disclosure, irradiation with an active energy radiation is performed preferably for from 0.01 second to 120 seconds, and more preferably for from 0.1 second to 90 seconds. Irradiation conditions and basic irradiation method for an active energy radiation is disclosed in JP-A No. S60-132767.

In the method of ink jet recording according to the present disclosure, it is preferable that the ink composition is heated to a certain temperature and that the time period from deposition to irradiation is set to be from 0.01 second to 0.5 seconds, more preferably from 0.01 second to 0.3 seconds, and further preferably 0.01 second to 0.15 seconds. After such a time period has passed, irradiation of a radiation is performed. In this way, by controlling the time period from deposition to irradiation to be extremely short, the deposited ink can be prevented from bleeding before curing. When applied to a porous recording medium, since the ink composition is exposed to light before an ink composition penetrates to a deep portion of a porous recording medium where a light source does not reach, residues of an unreacted polymerizable compound is reduced, and as a result, the film strength of an image is improved and an odor during light exposure is reduced.

In order to obtain a multiple color image, it is preferable that the image is formed by sequentially applying ink compositions having mutually different colors in the order of ascending brightness. Sequentially applying ink compositions in the order of ascending brightness makes it easier for an active energy radiation to reach the ink composition at the bottom, and a favorable curing sensitivity, a reduction in remaining polymerizable compound, and improvement of adhesion to a substrate are expected. The irradiation may be performed at once after all desired color ink compositions have been discharged, or may be performed each time a single color ink composition is deposited on a recording medium. It is preferable that the irradiation is performed each time a single color ink composition is deposited on a recording medium, from the viewpoint of enhancing curing.

<Ink-Jet Recording Apparatus>

Ink-jet recording apparatuses which can be used for the method of ink jet recording according to the present disclosure are not particularly restricted, and a known ink-jet recording apparatus may be selected as desired. Examples of the ink jet recording apparatus include a device equipped with an ink supplying system, a temperature sensor, and an active energy radiation source.

Examples of the ink supplying system include an ink supplying system including a storage tank containing the ink composition according to the present disclosure, supply piping, an ink supply tank immediately in front of an ink-jet head, a filter, and a piezo type ink-jet head.

It is preferable that the piezo type ink-jet head can discharge multi-size dots of preferably from 1 pl to 100 pl and more preferably 8 pl to 30 pl. The resolution is preferably from 320 dpi×320 dpi to 4,000 dpi x 4,000 dpi, more preferably from 400 dpi×400 dpi to 1,600 dpi x 1,600 dpi, and further preferably 720 dpi×720 dpi, and an ink-jet head which can discharge an ink with a resolution in the above ranges is preferable. The term "dpi" refers to the number of dots per 1 inch (2.54 cm) (dot per inch).

The ink-jet recording apparatus is preferably provided with a stabilizing means for stabilizing the temperature of the ink composition. Areas in which the temperature of the ink composition is to be maintained in a certain temperature range are all pipings and members located from the ink tank (intermediate tank when the ink-jet recording apparatus is provided with an intermediate tank) to the jetting face of the discharge nozzle. In other words, the ink-jet recording apparatus is preferably provided with a temperature stabilizing means by which thermal insulation and heating can be performed at a portion from the ink supply tank to the ink-jet head.

The method for controlling the temperature is not particularly restricted. For example, it is preferable that plural temperature sensors are provided on respective piping portions, and that heating control is performed in accordance with the flow rate of the ink composition and environmental temperature based on the detected values of the temperature sensors. The head unit to be heated is preferably thermally shielded or thermally insulated so as not to be influenced by the temperature of outside air. In order to shorten a starting time of a printer required for heating or to reduce a loss of heat energy, it is preferable that the head unit is thermally insulated from other portions and that the heat capacity of the whole heating unit is made small.

The ink-jet head is preferably an ink-jet head including a nozzle plate of which the surface on the ink discharging side has been processed to have affinity for ink and on which nozzle holes are two-dimensionally arranged. Examples of the ink jet head including a nozzle plate of which the surface on the ink discharging side has been processed to have affinity for ink include a piezo drive system on-demand ink-jet head manufactured by FUJIFILM DIMATIX (registered trademark), Inc. Specific examples of the ink-jet head include S-CLASS, Q-CLASS SAPPHIRE (trade name).

The nozzle plate is preferably a nozzle plate of which the surface on the ink discharging side has partly been processed to have affinity for ink, and more preferably a nozzle plate of which the surface on the ink discharging side has fully been processed to have affinity for ink.

Examples of the method for processing the nozzle plate surface to have affinity for ink include a method in which one or more non-ink repellent layers are formed on at least a part of the surface of the nozzle plate.

Specifically, it is preferable that the nozzle plate is provided with a layer formed of at least one metal or metal compound selected from the group consisting of gold, stainless steel, iron, titanium, tantalum, platinum, rhodium, nickel, chromium, silicon oxide, silicon nitride and aluminium nitride on at least a part of the surface of the nozzle plate on the ink discharging side. More preferably, the layer formed of a metal or a metal compound is a layer formed of at least one selected from the group consisting of gold, stainless steel, iron, titanium, silicon oxide, silicon nitride, and aluminium nitride. Still more preferably the layer formed of a metal or a metal compound is a layer formed of at least one selected from the group consisting of gold, stainless steel and silicon oxide. Most preferably the layer formed of a metal or a metal compound is a layer formed of silicon oxide.

In the method of processing the nozzle plate surface to have affinity for ink, the method employed for forming a metal or metal compound layer is not particularly limited, and a known method may be used. Examples of the method include: a method in which the surface of a nozzle plate made of silicon is thermally oxidized to form a silicon oxide film; a method in which an oxide film of silicon or a material other than silicon is oxidatively formed; and a method in which a metal or a metal compound layer is formed by sputtering. For details of the method for processing a nozzle plate surface to have affinity for ink, U.S. Unexamined Patent Application Publication No. 2010/0141709 can be referred to.

—Recording Medium—

The recording medium (also referred to as "a substrate") is not particularly restricted, and, for example, a paper material, such as a coated paper or a normal paper not having a coated layer, or a resin film obtained by forming a non-absorptive resin material or a resin material into a film shape or a sheet shape may be used.

Examples of the resin film include a polyethylene terephthalate (PET) film, a biaxially oriented polystyrene (OPS) film, a biaxially oriented polypropylene (OPP) film, a biaxially oriented polyamide (ONy) film, a polyvinyl chloride (PVC) film, a polyethylene (PE) film, and a triacetylcellulose (TAC) film. Examples of plastics which can be used for a recording medium include polycarbonate, acrylic resin, acrylonitrile/butadiene/styrene copolymer (ABS), polyacetal, polyvinyl alcohol (PVA), rubber, and composite material thereof. Examples of the recording medium also include a metal film, a metal plate, and glass.

<Printed Article>

The printed article according to the present disclosure is a printed article recorded by the above-described method of ink jet recording according to the present disclosure. Specifically, the printed article includes a recording medium and an image portion which is recorded using the ink composition for ink-jet recording according to the present invention.

The printed article according to the present disclosure is easy to handle and has a durability which prevents detachment of an image for a long time, since the printed article according to the present disclosure is provided with an image having excellent film strength and excellent adhesion to a recording medium recorded using the above-described ink composition according to the present disclosure.

EXAMPLES

Hereinafter, the present invention will be described in detail with reference to examples. However, the invention is not limited to these examples as long as the spirit of the invention is retained. In addition, "part(s)" in the following description is based on mass, unless otherwise specified.

The term "Mw" means a weight average molecular weight, and measurement of the weight average molecular weight was performed by gel permeation chromatography (GPC) as described above under the following conditions.

A calibration curve was created using eight samples of "standard sample, TSK standard, polystyrene", which are "F-40", "F-20", "F-4", "F-1", "A-5000", "A-2500", "A-1000", and "n-propyl benzene" manufactured by Tosoh Corporation.

<Conditions>

GPC: HLC (registered trademark) -8020GPC (manufactured by Tosoh Corporation)

Column: TSKGEL (registered trademark), SUPERMULTIPOREHZ-H (manufactured by Tosoh Corporation, 4.6 mm ID x 15 cm), 3 columns Eluant: THF (tetrahydrofuran)

Sample concentration: 0.45% by mass

Flow rate: 0.35 ml/min

Sample injection amount: 10 μl

Measurement temperature: 40° C.

RI detector was used.

<Synthesis of Polymer Compounds>

Polymer compounds (the above-described polymer P-1 and the like) were synthesized in the following manner. Indication of polymers such as "polymer P-1" and the like refers to the above-described exemplary polymer compounds, such as polymer P-1.

(Synthesis of Polymer P-1)

63.3 g of methyl propylene glycol was weighed into a 300 ml three-necked flask with a cooling tube and heated at 75° C. under nitrogen while stirring. Separately from this, a mixed solution prepared by mixing 42.2 g of methyl propylene glycol, 41.8 g of N-vinylcaprolactam, and 3.454 g of V-601 (trade name) (dimethyl 2,2'-azobis(2-methyl propionate), manufactured by Wako Pure Chemical Industries, Ltd.) was dropped into the flask over two hours. After finishing dropping, the mixture was heated at 75° C. for four hours, and 0.691 g of V-601 was added to the mixture, followed by further stirring at 90° C. for two hours, allowing the mixture to react. The obtained reaction liquid was allowed to cool, and the cooled reaction liquid was poured into 1500 ml of hexane, whereby purification was performed by re-precipitation, followed by vacuum drying. About 30 g of polymer P-1 was thus obtained.

(Synthesis of Polymer P-13)

70.5 g of methyl propylene glycol was weighed into a 300 ml three-necked flask with a cooling tube and heated at 75° C. under nitrogen while stirring. Separately from this, a mixed solution prepared by mixing 46.9 g of methyl propylene glycol, 29.2 g of N-vinylcaprolactam, 9.0 g of methyl methacrylate, 0.345 g of V-601 (trade name) (dimethyl 2,2'-azobis(2-methyl propionate), manufactured by Wako Pure Chemical Industries, Ltd.), and 11.746 g of dipentaerythritol hexakis (3-mercaptopropionate) was dropped into the flask over two hours. After finishing dropping, the mixture was heated at 75° C. for four hours, and 0.691 g of V-601 was added to the mixture, followed by further stirring at 90° C. for two hours, and then the mixture was allowed to react. The obtained reaction liquid was allowed to cool, and the cooled reaction liquid was poured into 1500 ml of hexane, whereby purification was performed by re-precipitation, followed by vacuum drying. Approximately 30 g of polymer P-13 was thus obtained.

(Synthesis of Polymer P-16)

92.3 g of methyl propylene glycol was weighed into a 300 ml three-necked flask with a cooling tube and heated at 75° C. under nitrogen while stirring. Separately from this, a mixed solution prepared by mixing 61.5 g of methyl propylene glycol, 41.8 g of N-vinylcaprolactam, 0.345 g of V-601 (trade name) (dimethyl 2,2'-azobis(2-methyl propionate), manufactured by Wako Pure Chemical Industries, Ltd.), and 11.746 g of dipentaerythritol hexakis(3-mercaptopropionate) was dropped into the flask over two hours. After finishing dropping, the mixture was heated at 75° C. for four hours, and 0.691 g of V-601 was added to the mixture, followed by further stirring at 90° C. for two hours, allowing the mixture to react. The obtained reaction liquid was allowed to cool, and the cooled reaction liquid was poured into 1500 ml of hexane, whereby purification was performed by by re-precipitation, followed by vacuum drying. Approximately 30 g of polymer P-16 was thus obtained.

(Synthesis of Polymer P-27)

82.1 g of methyl propylene glycol was weighed into a 300 ml three-necked flask with a cooling tube and heated at 75° C. under nitrogen while stirring. Separately from this, a mixed solution prepared by mixing 54.7 g of methyl propylene glycol, 29.2 g of N-vinylcaprolactam, 17.3 g of phenoxyethyl acrylate, 0.345 g of V-601 (trade name) (dimethyl 2,2'-azobis(2-methyl propionate), manufactured by Wako Pure Chemical Industries, Ltd.), and 11.746 g of dipentaerythritol hexakis (3-mercapto propionate) was dropped into the flask over two hours. After finishing dropping, the mixture was heated at 75° C. for four hours, and 0.691 g of V-601 was added to the mixture, followed by further stirring at 90° C. for two hours, allowing the mixture to react. The obtained reaction liquid was allowed to cool, and the cooled reaction liquid was poured into 1500 ml of hexane, whereby purification was performed by re-precipitation, followed by vacuum drying. Approximately 30 g of polymer P-27 was thus obtained.

(Synthesis of Polymer P-2)

The synthesis of polymer P-2 was performed in the same manner as the synthesis of polymer P-16 except that the multifunctional thiol was not used, and that the monomer listed in the above-described Table 1 was used.

(Synthesis of Polymers P-3 to P-4)

The synthesis of polymers P-3 to P-4 was performed in the same manner as the synthesis of polymer P-13 except that the multifunctional thiol was not used, and that the monomer listed in the above-described Table 1 was used.

(Synthesis of Polymers P-5 to P-6)

The synthesis of polymers P-5 to P-6 was performed in the same manner as the synthesis of polymer P-16 except that the types of the multifunctional thiol and the monomer were changed as listed in the above-described Table 1.

(Synthesis of Polymers P-7 to P-12)

The synthesis of polymers P-7 to P-12 was performed in the same manner as the synthesis of polymer P-13 except that the types of the multifunctional thiol and the monomer were changed as listed in the above-described Tables 1 to 2.

(Synthesis of Polymers P-14 to P-15)

The synthesis of polymers P-14 to P-15 was performed in the same manner as the synthesis of polymer P-13 except that the type of the multifunctional thiol was changed as listed in the above-described Table 3.

(Synthesis of Polymers P-17 to P-26, P-28 to P-32)

The synthesis of polymers P-17 to P-26, P-28 to P-32 was performed in the same manner as the synthesis of polymer P-13 except that the type of the monomer was changed as listed in the above-described Tables 3 to 6.

(Synthesis of Polymer C-1)

The synthesis of polymer C-1 was performed in the same manner as the synthesis of polymer P-16 except that the multifunctional thiol was not used, and that the monomer listed in Table 8 below was used.

(Synthesis of Polymers C-2 to C-3)

The synthesis of polymers C-2 to C-3 was performed in the same manner as the synthesis of polymer P-16 except that the types of the multifunctional thiol and the monomer were changed as listed in Table 8 below.

(Synthesis of Polymers C-4 to C-5)

The synthesis of polymers C-4 to C-5 was performed in the same manner as the synthesis of polymer P-13 except that the types of the multifunctional thiol and the monomer were changed as listed in Table 8 below.

<Preparation of Pigment Dispersions>

A pigment, a dispersant, and a polymerizable compound listed below were mixed and stirred using a mixer (manufactured by Silverson Machines Inc., L4R (trade name)) at 2,500 rpm for 10 minutes to obtain a mixture. Thereafter, the obtained mixture was placed in a bead mill disperser DISPERMAT LS (trade name; manufactured by VMA-GETZ-MANN GMBH.) and dispersed using a YTZ Ball (trade name; manufactured by Nikkato Corporation) having a diameter of 0.65 mm at 2,500 rpm for six hours to prepare a pigment dispersion of each color (Y, M, C, K, and W).

Yellow pigment dispersion (Y)

| | |
|---|---|
| Pigment: C.I. Pigment Yellow 12 | 10 parts |
| Dispersant: SOLSPERSE 32000 | 5 parts |
| Monofunctional polymerizable compound: 2-phenoxyethyl acrylate | 85 parts |

Magenta pigment dispersion (M)

| | |
|---|---|
| Pigment: C.I. Pigment Red 57:1 | 15 parts |
| Dispersant: SOLSPERSE 32000 | 5 parts |
| Monofunctional polymerizable compound: 2-phenoxyethyl acrylate | 80 parts |

Cyan pigment dispersion (C)

| | |
|---|---|
| Pigment: C.I. Pigment Blue 15:3 | 20 parts |
| Dispersant: SOLSPERSE 32000 | 5 parts |
| Monofunctional polymerizable compound: 2-phenoxyethyl acrylate | 75 parts |

Black pigment dispersion (K)

| | |
|---|---|
| Pigment: C.I. Pigment Black 7 | 20 parts |
| Dispersant: SOLSPERSE 32000 | 5 parts |
| Monofunctional polymerizable compound: 2-phenoxyethyl acrylate | 75 parts |

White pigment dispersion (W)

| | |
|---|---|
| Pigment: MICROLITH WHITE R-A | 20 parts |
| Dispersant: SOLSPERSE 32000 | 5 parts |
| Monofunctional polymerizable compound: 2-phenoxyethyl acrylate | 75 parts |

The details of the ingredients used for preparing the above-described pigment dispersions were as follows.

C.I. Pigment Yellow 12 (yellow pigment, manufactured by Clariant Corporation)

C.I. Pigment Red 57: 1 (magenta pigment, manufactured by Clariant Corporation)

C.I. Pigment Blue 15: 3 (cyan pigment, manufactured by Clariant Corporation)

C.I. Pigment Black 7 (black pigment, manufactured by Clariant Corporation)

MICROLITH (registered trademark) WHITE R-A (white pigment, BASF Corporation)

SOLSPERSE 32000 (trade name, polymeric dispersant, manufactured by Lubrizol Japan Limited)

Examples 1 to 3 and Comparative Examples 1 to 5

The following ingredients (13 parts in total) were added and mixed to the ingredients listed in Table 7 below, and were stirred at 1,000 rpm for 5 minutes using a mixer (manufactured by Silverson Machines Inc., L4R). Thereafter, the obtained mixture was filtrated using a cartridge filter (product name: profile IIABO1A01014J) manufactured by Nihon Pall Manufacturing Ltd. to prepare a coating composition (polymerizable composition).

<Composition>

| | |
|---|---|
| Polymerization inhibitor: GENORAD 16 (trade name; manufactured by Rahn AG) | 0.75 parts |
| Photopolymerization initiator: LUCIRIN (registered trademark) TPO (2,4,6-trimethylbenzoyl diphenyl phosphine oxide, manufactured by BASF Corporation, polymerization initiator (B)) | 2.0 parts |
| Photopolymerization initiator: IRGACURE (registered trademark) 184 (1-hydroxy-cyclohexyl-phenyl-ketone, manufactured by BASF Corporation, polymerization initiator (B)) | 2.2 parts |
| Photopolymerization initiator: IRGACURE (registered trademark) 819 (bis(2,4,6-trimethylbenzoyl)-phenyl phosphine oxide, manufactured by BASF Corporation, polymerization initiator (B)) | 8.0 parts |
| Surfactant: BYK307 (trade name; manufactured by BYK Chemie GmbH) | 0.05 parts |

The total amount of the above-described ingredients and the ingredients listed in Table 7 below was adjusted to 100 parts. "-" shown in Table 7 below means that the ingredient is not contained. The amount of "PEA (*)" listed in Table 7 below includes the amount of PEA derived from a pigment dispersion.

—Evaluation 1—

Each of the coating compositions prepared in Examples and Comparative Examples was applied to the surface of a polycarbonate sheet (manufactured by Teijin Chemicals Ltd.; referred to as PC) or an acrylic sheet (manufactured by Japan Acryace Corporation; referred to as Acryl) by bar coating such that the dry coating amount was 1.0 g/m² to form a coating film, and then the coating film was irradiated with a 200 W mercury xenon lamp (EXECURE 3000 (trade name; manufactured by HOYA CORPORATION), wavelength=365 nm, light exposure: 800 mJ/cm²) to cure the coating film, whereby a cured film was obtained.

For each cured film, evaluations of adhesion to a substrate and evaluation of pencil hardness were performed by the method described in the "Evaluation 2" below. The results are also listed in Table 7.

TABLE 7

| | Polymer compound (A) | | | | | Polymerizable compound (C) (parts by mass) Monofunctional | | |
|---|---|---|---|---|---|---|---|---|
| | Polymer species | Polymer composition ratio (mol %) Monomer 1 | Monomer 2 | Mw | Addition amount (parts by mass) | IBOA | PEA (*) | CTFA |
| Example 1 | P-13 | 70 | 30 | 3000 | 8 | 15 | 39 | 20 |
| Example 2 | P-16 | 100 | 0 | 3000 | 8 | 15 | 39 | 20 |
| Example 3 | P-27 | 70 | 30 | 3000 | 8 | 15 | 39 | 20 |
| Comparative Example 1 | C-1 | 100 | 0 | 20000 | 8 | 15 | 39 | 20 |
| Comparative Example 2 | C-2 | 100 | 0 | 20000 | 8 | 15 | 39 | 20 |
| Comparative Example 3 | C-3 | 100 | 0 | 20000 | 8 | 15 | 39 | 20 |
| Comparative Example 4 | C-4 | 60 | 40 | 20000 | 8 | 15 | 39 | 20 |
| Comparative Example 5 | C-5 | 90 | 10 | 20000 | 8 | 15 | 39 | 20 |

| | Polymerizable compound (C) (parts by mass) | | | Evaluation Adhesion to substrate | | Pencil hardness |
|---|---|---|---|---|---|---|
| | Monofunctional THFA | EOEOEA | Multifunctional DPHA | PC | Acryl | |
| Example 1 | — | — | 5 | 1 | 0 | H |
| Example 2 | — | — | 5 | 1 | 1 | H |

TABLE 7-continued

| | | | | | | |
|---|---|---|---|---|---|---|
| Example 3 | — | — | 5 | 0 | 0 | H |
| Comparative Example 1 | — | — | 5 | 2 | 2 | C |
| Comparative Example 2 | — | — | 5 | 2 | 2 | C |
| Comparative Example 3 | — | — | 5 | 4 | 4 | B |
| Comparative Example 4 | — | — | 5 | 2 | 2 | B |
| Comparative Example 5 | — | — | 5 | 4 | 4 | B |

As indicated in Table 7, in Examples, cured films whose adhesion to a substrate was excellent and which had a favorable hardness were obtained. In contrast, Comparative Examples 1 to 5 not including a specific resin according to the present disclosure produced results having problems that all of the cured films had a poor adhesion to a substrate, hardness of the cured film was also low, and the cured film was vulnerable to damage.

Examples 4 to 40

Preparation of Ink Composition

The following ingredients of a composition (13 parts in total) were added and mixed to the ingredients listed in Table 9 below, and were stirred at 1,000 rpm for 5 minutes using a mixer (manufactured by Silverson Machines Inc., L4R (trade name)) to obtain a mixture. Thereafter, the obtained mixture was filtrated using a cartridge filter (product name: profile IIABO1A01014J) manufactured by Nihon Pall Manufacturing Ltd. to prepare an ink composition.

<Composition>
Polymerization inhibitor: GENORAD 16 (trade name; manufactured by Rahn AG) . . . 0.75 parts
Photopolymerization initiator: LUCIRIN (registered trademark) TPO . . . 2.0 parts (2,4,6-trimethylbenzoyl diphenyl phosphine oxide, manufactured by BASF Corporation, polymerization initiator (B))
Photopolymerization initiator: IRGACURE (registered trademark) 184 . . . 2.2 parts (1-hydroxycyclohexyl phenyl ketone, manufactured by BASF Corporation, polymerization initiator (B))
Photopolymerization initiator: IRGACURE (registered trademark) 819 . . . 8.0 parts (bis(2,4,6-trimethylbenzoyl)-phenyl phosphine oxide, manufactured by BASF Corporation, polymerization initiator (B))
Surfactant: BYK307 (trade name; manufactured by BYK Chemie GmbH) . . . 0.05 parts The total amount of the above-described ingredients and the ingredients listed in Tables 9 to 10 below was adjusted to 100 parts.

—Measurement of Viscosity—

The viscosity of the prepared ink composition was measured using an RE-85L (trade name; manufactured by Toki Sangyo Co., Ltd.) at 25° C. The measurement results are also listed in Tables 11 to 12 below.

Examples 41 to 42

Ink compositions were prepared in the same manner as that in Example 4 except that the type of the polymerizable compound was changed as listed in Table 10 below.

Examples 43 to 46

Polymers P-27A, P-27B, P-27C, and P-27D having a monomer ratio different from that of polymer P-27 were synthesized in the same manner as the synthesis of polymer P-27 except that the ratios of two monomers (monomer 1 and monomer 2) were changed as listed in Table 10 below.

Ink compositions were prepared in the same manner as that in Example 35 except that the polymer P-27 was changed to polymer P-27A, P-27B, P-27C, and P-27D, respectively.

Examples 47 to 49

Polymers P-29A, P-29B, and P-29C having a weight-average molecular weight (Mw) different from that of the polymer P-29 were synthesized in the same manner as the synthesis of polymer P-29 except that the weight-average molecular weight was changed as listed in Table 10 below.

The ink compositions were prepared in the same manner as that in Example 37 except that polymer P-29 was replaced by polymer P-29A, P-29B, or P-29C, respectively.

Examples 50 to 52

The ink compositions were prepared in the same manner as that in Example 11 except that the addition amount of polymer P-3 was changed as listed in Table 10 below.

Examples 53 to 56

The ink compositions were prepared in the same manner as that in Example 21 except that the addition amount of polymer P-13 was changed as listed in Table 10 below.

Example 57

The ink composition was prepared in the same manner as that in Example 4 except that the multifunctional acrylate (DPHA), which is a polymerizable compound, was not used, and that the addition amount of the monofunctional polymerizable compound was changed as listed in Table 10 below.

Comparative Examples 6 to 10

The ink compositions were prepared in the same manner as that in Example 4 except that polymer P-16 was replaced by comparative polymers C-1 to C-5 for comparison as listed in Table 10 below.

TABLE 8

| Polymer compound | | Monomer for forming repeating units of the polymer chain [(R)n in the left column] | |
|---|---|---|---|
| | | Repeating unit | |
| C-1 | — | [Monomer 1: methyl acrylate repeating unit] | — |
| C-2 | (R)n—S—CH₂CH₂—C(=O)—O—(CH₂CH₂O)₄—C(=O)—CH₂CH₂—S—(R)n | [Monomer 1: methyl acrylate repeating unit] | — |
| C-3 | [Tetrafunctional thiol structure based on pentaerythritol tetrakis(3-mercaptopropionate) with four S—(R)n groups]<br>Multifunctional thiol = tetrafunctional | [Monomer 1: decyl acrylate repeating unit, —O—C₁₀H₂₁] | — |
| C-4 | [Trifunctional thiol structure based on trimethylolpropane tris(3-mercaptopropionate) with three S—(R)n groups]<br>Multifunctional thiol = trifunctional | [Monomer 1: acryloyl morpholine repeating unit] | [Monomer 2: methyl acrylate repeating unit] |
| C-5 | [Tetrafunctional thiol structure based on pentaerythritol tetrakis(3-mercaptopropionate) with four S—(R)n groups]<br>Multifunctional thiol = tetrafunctional | [Monomer 1: methyl acrylate repeating unit] | [Monomer 2: acrylate with propyl-Si(O-Si)₁₂ siloxane side chain] |

—Evaluation 2—

For each ink composition prepared in Examples and Comparative Examples, adhesion of an image to a recording medium (adhesion to a substrate), film hardness by a pencil hardness test, and discharge stability were evaluated. The results are listed in Tables 11 to 12.

(i) Adhesion to Substrate

As recording media (substrates), a polycarbonate sheet (manufactured by Teijin Chemicals Ltd.; in the Table, abbreviated to "PC") and an acrylic sheet (manufactured by Japan Acryace Corporation; in the Table, abbreviated to "Acryl") were used, and adhesion of an ink (image) to the recording media was evaluated by the following method.

First, each of the ink compositions obtained in Examples and Comparative Examples were applied to a surface of each substrate using a K Hand Coater (bar No. 2) in an amount to provide a wet film thickness of 12 μm.

Next, the coating film formed by the application was irradiated with an energy radiation using a CSOT UV mini conveyor for experimental use (manufactured by GS Yuasa Power Supply Ltd.; conveyer speed: 9.0 m/min., exposure intensity: 2.0 $W/cm^2$) equipped with a MAN250L ozoneless metal halide lamp, to obtain a cured coating film. The adhesion to a recording medium was evaluated using the cured coating film according to the following evaluation criteria in accordance with ISO 2409 (cross-cut method). Among the evaluation criteria, 0 to 1 are practically acceptable.

In the following evaluation criteria 0 to 5, "%" representing detachment of a lattice is a ratio as defined below. Specifically, the film was cut at right angles at 1 mm intervals, whereby a lattice having 25 cells was obtained. The ratio of the number of cells in which film detachment was observed to the number of formed cells (25) is expressed as a percentage.

Ratio of detached lattice (%)=(number of cells in which detachment was observed/total number of cells)×100

<Evaluation Criteria>

0: The edges of the cuts are smooth, and none of the cells are detached.

1: Slight detachment of the coating film at the intersections of the cuts is observed. An area where the detachment was observed is 5% or less of the total number of cells.

2: Detachment is observed at least along the edges of the cuts of the coating film or on the intersections of the cuts. An area where the detachment is observed is more than 5% and 15% or less of the total number of cells.

3: Partial or complete detachment is observed along the edges of the cuts of the coating film, or partial or complete detachment is observed at a variety of portions of the lattice. An area where the detachment is observed is from more than 15% to 35% of the total number of cells.

4: Partial or complete detachment is observed along the edges of the cuts of the coating film, or partial or complete detachment is observed at a variety of portions of the lattice. An area where the detachment is observed is from more than 35% to 65% of the total number of cells.

5: An area where the detachment is observed is more than 65% of the total number of cells.

(ii) Pencil Hardness

For ink cured films prepared in the same manner as the cured films used in the evaluation of the adhesion to a substrate, pencil hardness test was performed in accordance with JIS K5600-5-4. The pencil hardness is defined by resistance of a coating film against a scar or other defects (that is, plastic deformation, cohesive fracture, and combinations thereof) generated when a prescribed pencil lead was pressed against the surface of the coating film and moved in this state. In the pencil hardness test, the hardness of the hardest pencil which did not generate a scar was determined. The tip of the lead of a pencil for the test was made flat, and the tip was moved on the surface of an ink cured film with a load of 750±10 g at an inclination angle of the pencil of approximately 45°. The test was repeated twice, and when the two results were different from each other, the test was performed again.

The acceptable range of the hardness of the ink composition is HB or harder, and preferably H or harder. A printed article exhibiting an evaluation result of B or softer is not preferable since the printed article may be damaged when handled. For the pencils, UNI (registered trademark) manufactured by MITSUBISHIPENCIL CO., LTD. were used.

(iii) Discharge Stability

In order to evaluate the dischargeability of an ink at a head nozzle during ink jet recording, a commercially available ink jet recording apparatus (manufactured by Fujifilm Corporation, LUXELJET (registered trademark) UV3600GT/XT: trade name) provided with a piezo type ink jetting head was used, and evaluation was performed by the following method.

A PET (polyethylene terephthalate) film (manufactured by Toray Industries, Inc.) was prepared as a recording medium (substrate), and onto the PET film. Each of the ink compositions obtained in Examples and Comparative Examples was continuously discharged by an ink jet recording apparatus for 60 minutes under the following discharge conditions. Then, the deposited ink was irradiated with an ultraviolet (UV) light (irradiation amount: 1000 $mW/cm^2$). The number of nozzles in which ink clogging (nozzle loss) ocurred during the 60-minute-continuous discharging was determined, and evaluation was performed according to the following evaluation criteria. The discharge stability A or B is practically acceptable.

<Discharge Conditions>

Number of channels: 318/head

Drive frequency: 4.8 kHz/dot

Ink droplet: 7 droplets, 42 pl

Head nozzle temperature: 45° C.

<Evaluation Criteria>

A: Number of nozzle losses being from 0 to less than 5

B: Number of nozzle losses being from 5 to less than 10

C: Number of nozzle losses being 10 or more

TABLE 9

| | Polymer compound (A) | | | | | Polymerizable compound (C) (parts by mass) | | | | | | Pigment dispersion | |
| | Polymer composition ratio (mol %) | | | Addition amount | Monofunctional | | | | | Multifunctional | | Addition amount |
| | Polymer species | Monomer 1 | Monomer 2 | Mw | (parts by mass) | IBOA | PEA (*) | CTFA | THFA | EOEOEA | DPHA | Type | (parts by mass) |
|---|---|---|---|---|---|---|---|---|---|---|---|---|---|
| Example 4 | P-16 | 100 | 0 | 3000 | 8 | 15 | 32 | 20 | — | — | 5 | Y | 7 |
| Example 5 | P-16 | 100 | 0 | 3000 | 8 | 15 | 26 | 20 | — | — | 5 | M | 13 |
| Example 6 | P-16 | 100 | 0 | 3000 | 8 | 15 | 32 | 20 | — | — | 5 | C | 7 |
| Example 7 | P-16 | 100 | 0 | 3000 | 8 | 15 | 26 | 20 | — | — | 5 | W | 13 |
| Example 8 | P-16 | 100 | 0 | 3000 | 8 | 15 | 39 | 20 | — | — | 5 | — | — |
| Example 9 | P-1 | 100 | 0 | 3000 | 8 | 15 | 32 | 20 | — | — | 5 | K | 7 |
| Example 10 | P-2 | 100 | 0 | 3000 | 8 | 15 | 32 | 20 | — | — | 5 | K | 7 |
| Example 11 | P-3 | 70 | 30 | 3000 | 8 | 15 | 32 | 20 | — | — | 5 | K | 7 |
| Example 12 | P-4 | 70 | 30 | 3000 | 8 | 15 | 32 | 20 | — | — | 5 | K | 7 |
| Example 13 | P-5 | 100 | 0 | 3000 | 8 | 15 | 32 | 20 | — | — | 5 | K | 7 |
| Example 14 | P-6 | 100 | 0 | 3000 | 8 | 15 | 32 | 20 | — | — | 5 | K | 7 |
| Example 15 | P-7 | 70 | 30 | 3000 | 8 | 15 | 32 | 20 | — | — | 5 | K | 7 |
| Example 16 | P-8 | 70 | 30 | 3000 | 8 | 15 | 32 | 20 | — | — | 5 | K | 7 |
| Example 17 | P-9 | 70 | 30 | 3000 | 8 | 15 | 32 | 20 | — | — | 5 | K | 7 |
| Example 18 | P-10 | 70 | 30 | 3000 | 8 | 15 | 32 | 20 | — | — | 5 | K | 7 |
| Example 19 | P-11 | 70 | 30 | 3000 | 8 | 15 | 32 | 20 | — | — | 5 | K | 7 |
| Example 20 | P-12 | 70 | 30 | 3000 | 8 | 15 | 32 | 20 | — | — | 5 | K | 7 |
| Example 21 | P-13 | 70 | 30 | 3000 | 8 | 15 | 32 | 20 | — | — | 5 | K | 7 |
| Example 22 | P-14 | 70 | 30 | 3000 | 8 | 15 | 32 | 20 | — | — | 5 | K | 7 |
| Example 23 | P-15 | 70 | 30 | 3000 | 8 | 15 | 32 | 20 | — | — | 5 | K | 7 |
| Example 24 | P-16 | 100 | 0 | 3000 | 8 | 15 | 32 | 20 | — | — | 5 | K | 7 |
| Example 25 | P-17 | 70 | 30 | 3000 | 8 | 15 | 32 | 20 | — | — | 5 | K | 7 |
| Example 26 | P-18 | 70 | 30 | 3000 | 8 | 15 | 32 | 20 | — | — | 5 | K | 7 |
| Example 27 | P-19 | 70 | 30 | 3000 | 8 | 15 | 32 | 20 | — | — | 5 | K | 7 |
| Example 28 | P-20 | 70 | 30 | 3000 | 8 | 15 | 32 | 20 | — | — | 5 | K | 7 |
| Example 29 | P-21 | 70 | 30 | 3000 | 8 | 15 | 32 | 20 | — | — | 5 | K | 7 |
| Example 30 | P-22 | 70 | 30 | 3000 | 8 | 15 | 32 | 20 | — | — | 5 | K | 7 |
| Example 31 | P-23 | 70 | 30 | 3000 | 8 | 15 | 32 | 20 | — | — | 5 | K | 7 |
| Example 32 | P-24 | 70 | 30 | 3000 | 8 | 15 | 32 | 20 | — | — | 5 | K | 7 |
| Example 33 | P-25 | 70 | 30 | 3000 | 8 | 15 | 32 | 20 | — | — | 5 | K | 7 |
| Example 34 | P-26 | 70 | 30 | 3000 | 8 | 15 | 32 | 20 | — | — | 5 | K | 7 |
| Example 35 | P-27 | 70 | 30 | 3000 | 8 | 15 | 32 | 20 | — | — | 5 | K | 7 |
| Example 36 | P-28 | 70 | 30 | 3000 | 8 | 15 | 32 | 20 | — | — | 5 | K | 7 |
| Example 37 | P-29 | 70 | 30 | 3000 | 8 | 15 | 32 | 20 | — | — | 5 | K | 7 |
| Example 38 | P-30 | 70 | 30 | 3000 | 8 | 15 | 32 | 20 | — | — | 5 | K | 7 |
| Example 39 | P-31 | 70 | 30 | 3000 | 8 | 15 | 32 | 20 | — | — | 5 | K | 7 |
| Example 40 | P-32 | 70 | 30 | 3000 | 8 | 15 | 32 | 20 | — | — | 5 | K | 7 |

TABLE 10

| | Polymer compound (A) | | | | | Polymerizable compound (C) (parts by mass) | | | | | | | Addition amount |
| | Polymer composition ratio (mol %) | | | Addition amount | Monofunctional | | | | | Multifunctional | | |
| | Polymer species | Monomer 1 | Monomer 2 | Mw | (parts by mass) | IBOA | PEA (*) | CTFA | THFA | EOEOEA | DPHA | Type | (parts by mass) |
|---|---|---|---|---|---|---|---|---|---|---|---|---|---|
| Example 41 | P-16 | 100 | 0 | 3000 | 8 | 15 | 32 | — | 20 | — | 5 | K | 7 |
| Example 42 | P-16 | 100 | 0 | 3000 | 8 | 15 | 32 | — | — | 20 | 5 | K | 7 |
| Example 43 | P-27A | 80 | 20 | 3000 | 8 | 15 | 32 | 20 | — | — | 5 | K | 7 |
| Example 44 | P-27B | 60 | 40 | 3000 | 8 | 15 | 32 | 20 | — | — | 5 | K | 7 |
| Example 45 | P-27C | 50 | 50 | 3000 | 8 | 15 | 32 | 20 | — | — | 5 | K | 7 |
| Example 46 | P-27D | 40 | 60 | 3000 | 8 | 15 | 32 | 20 | — | — | 5 | K | 7 |
| Example 47 | P-29A | 70 | 30 | 2000 | 8 | 15 | 32 | 20 | — | — | 5 | K | 7 |
| Example 48 | P-29B | 70 | 30 | 10000 | 8 | 15 | 32 | 20 | — | — | 5 | K | 7 |
| Example 49 | P-29C | 70 | 30 | 20000 | 8 | 15 | 32 | 20 | — | — | 5 | K | 7 |
| Example 50 | P-3 | 70 | 30 | 3000 | 5 | 15 | 35 | 20 | — | — | 5 | K | 7 |
| Example 51 | P-3 | 70 | 30 | 3000 | 10 | 15 | 30 | 20 | — | — | 5 | K | 7 |
| Example 52 | P-3 | 70 | 30 | 3000 | 13 | 15 | 27 | 20 | — | — | 5 | K | 7 |
| Example 53 | P-13 | 70 | 30 | 3000 | 5 | 15 | 35 | 20 | — | — | 5 | K | 7 |
| Example 54 | P-13 | 70 | 30 | 3000 | 10 | 15 | 30 | 20 | — | — | 5 | K | 7 |
| Example 55 | P-13 | 70 | 30 | 3000 | 13 | 15 | 27 | 20 | — | — | 5 | K | 7 |
| Example 56 | P-13 | 70 | 30 | 3000 | 15 | 15 | 25 | 20 | — | — | 5 | K | 7 |
| Example 57 | P-16 | 100 | 0 | 3000 | 8 | 15 | 37 | 20 | — | — | 0 | K | 7 |

TABLE 10-continued

| | Polymer compound (A) | | | | Polymerizable compound (C) (parts by mass) | | | | | | | Addition amount (parts by mass) |
|---|---|---|---|---|---|---|---|---|---|---|---|---|
| | | Polymer composition ratio (mol %) | | | Addition amount (parts by mass) | Monofunctional | | | | | Multifunctional | |
| | Polymer species | Monomer 1 | Monomer 2 | Mw | | IBOA | PEA (*) | CTFA | THFA | EOEOEA | DPHA | Type |
| Comparative Example 6 | C-1 | 100 | 0 | 20000 | 8 | 15 | 32 | 20 | — | — | 5 | K | 7 |
| Comparative Example 7 | C-2 | 100 | 0 | 20000 | 8 | 15 | 32 | 20 | — | — | 5 | K | 7 |
| Comparative Example 8 | C-3 | 100 | 0 | 20000 | 8 | 15 | 32 | 20 | — | — | 5 | K | 7 |
| Comparative Example 9 | C-4 | 60 | 40 | 20000 | 8 | 15 | 32 | 20 | — | — | 5 | K | 7 |
| Comparative Example 10 | C-5 | 90 | 10 | 20000 | 8 | 15 | 32 | 20 | — | — | 5 | K | 7 |

The details of the polymerizable compounds in the Tables are as follows.

IBOA: isobornyl acrylate (monofunctional radical polymerizable compound: ARONIX (registered trademark) M-156, manufactured by TOAGOSEI CO., LTD.)

PEA: 2-phenoxyethyl acrylate (monofunctional radical polymerizable compound: VISCOAT #192 (trade name), manufactured by Osaka Organic Chemical Industry Ltd.)

CTFA: cyclic trimethylol propane formal acrylate (monofunctional polymerizable compound: SR-531 (trade name), manufactured by Sartomer Japan Inc.)

THFA: tetrahydrofurfuryl acrylate (monofunctional polymerizable compound: SR-285 (trade name), manufactured by Sartomer Japan Inc.)

EOEOEA: 2-(2-ethoxyethoxy)ethyl acrylate (monofunctional polymerizable compound: SR256 (trade name), manufactured by Sartomer Japan Inc.)

DPHA: dipentaerythrytol hexaacrylate (multifunctional acrylate (hexafunctional radical polymerizable compound), A-DPH (trade name), manufactured by Shin-Nakamura Chemical Co., Ltd.)

TABLE 11

| | Evaluation | | | | |
|---|---|---|---|---|---|
| | Ink viscosity [Pa·s] | Discharge stability | Adhesion to a substrate | | Pencil hardness |
| | | | PC | Acryl | |
| Example 4 | 20 | A | 1 | 1 | H |
| Example 5 | 20 | A | 1 | 1 | H |
| Example 6 | 20 | A | 1 | 1 | H |
| Example 7 | 20 | A | 1 | 1 | H |
| Example 8 | 20 | A | 1 | 1 | H |
| Example 9 | 30 | B | 1 | 1 | H |
| Example 10 | 30 | B | 1 | 1 | H |
| Example 11 | 30 | B | 1 | 0 | H |
| Example 12 | 30 | B | 1 | 0 | H |
| Example 13 | 26 | B | 1 | 1 | H |
| Example 14 | 26 | B | 1 | 1 | H |
| Example 15 | 26 | B | 1 | 1 | H |
| Example 16 | 26 | B | 1 | 0 | H |
| Example 17 | 26 | B | 1 | 0 | H |
| Example 18 | 25 | B | 1 | 0 | H |
| Example 19 | 25 | B | 1 | 0 | H |
| Example 20 | 23 | A | 1 | 0 | H |
| Example 21 | 20 | A | 1 | 0 | H |
| Example 22 | 20 | A | 1 | 0 | H |
| Example 23 | 20 | A | 1 | 0 | H |

TABLE 11-continued

| | Evaluation | | | | |
|---|---|---|---|---|---|
| | Ink viscosity [Pa·s] | Discharge stability | Adhesion to a substrate | | Pencil hardness |
| | | | PC | Acryl | |
| Example 24 | 20 | A | 1 | 1 | H |
| Example 25 | 18 | A | 1 | 0 | H |
| Example 26 | 18 | A | 1 | 0 | H |
| Example 27 | 18 | A | 1 | 0 | H |
| Example 28 | 18 | A | 1 | 0 | H |
| Example 29 | 18 | A | 1 | 0 | H |
| Example 30 | 18 | A | 1 | 0 | H |
| Example 31 | 18 | A | 1 | 0 | H |
| Example 32 | 20 | A | 1 | 0 | H |
| Example 33 | 20 | A | 1 | 0 | H |
| Example 34 | 20 | A | 1 | 0 | H |
| Example 35 | 18 | A | 0 | 0 | H |
| Example 36 | 18 | A | 0 | 0 | H |
| Example 37 | 18 | A | 0 | 0 | H |
| Example 38 | 18 | A | 0 | 0 | H |
| Example 39 | 18 | A | 0 | 0 | H |
| Example 40 | 18 | A | 0 | 0 | H |

TABLE 12

| | Evaluation | | | | |
|---|---|---|---|---|---|
| | Ink viscosity [Pa·s] | Discharge stability | Adhesion to a substrate | | Pencil hardness |
| | | | PC | Acryl | |
| Example 41 | 20 | A | 1 | 1 | HB |
| Example 42 | 20 | A | 1 | 1 | HB |
| Example 43 | 19 | A | 0 | 0 | H |
| Example 44 | 18 | A | 0 | 0 | H |
| Example 45 | 18 | A | 0 | 0 | H |
| Example 46 | 18 | A | 0 | 0 | H |
| Example 47 | 18 | A | 0 | 0 | H |
| Example 48 | 30 | B | 0 | 0 | H |
| Example 49 | 40 | B | 0 | 0 | H |
| Example 50 | 25 | A | 1 | 0 | HB |
| Example 51 | 35 | B | 1 | 0 | H |
| Example 52 | 45 | B | 1 | 0 | H |
| Example 53 | 18 | A | 1 | 0 | HB |
| Example 54 | 25 | A | 1 | 0 | H |
| Example 55 | 30 | B | 1 | 0 | H |
| Example 56 | 35 | B | 1 | 0 | H |
| Example 57 | 20 | A | 0 | 0 | HB |
| Comparative | 70 | C | 2 | 2 | C |

TABLE 12-continued

| | | Evaluation | | | |
|---|---|---|---|---|---|
| | Ink viscosity | Discharge | Adhesion to a substrate | | Pencil |
| | [Pa · s] | stability | PC | Acryl | hardness |
| Example 6 | | | | | |
| Comparative Example 7 | 70 | C | 2 | 2 | C |
| Comparative Example 8 | 30 | B | 4 | 4 | B |
| Comparative Example 9 | 60 | C | 2 | 2 | B |
| Comparative Example 10 | 30 | B | 4 | 4 | B |

As indicated in Tables 11 to 12, in Examples, increase in the viscosity of the ink compositions was inhibited, and the discharge stability of the ink compositions was excellent. The recorded images had a favorable film strength and an excellent adhesion to a recording medium (adhesion to a substrate).

In contrast, in Comparative Examples 6 to 10, in which the specific resin (polymer compound) in the present disclosure was not selected, the viscosity of the ink compositions was not stable, the discharge performance was insufficient, adhesion of the recorded images to a substrate was also poor, and the film strength was also poor. Such results were not improved also in Comparative Example 7, in which the polymer included a skeleton structure derived from a bifunctional thiol. In Comparative Example 8, in which the polymer did not include the specific cyclic amide structure and in which the number of the carbon atoms in the polymer chain was more than eight, the adhesion to a substrate was considerably poor. In Comparative Example 10, in which polymer C-5 includes plural —SiO— units in the polymer chains of the resin, the adhesion to a substrate was considerably deteriorated, similar to Comparative Example 8. In Comparative Example 9, in which polymer C-4 having a polymer chain including a nitrogen atom (N) as an amide which was different from Formula (1) or (2) was used in place of the specific resin according to the present disclosure, increase in the viscosity of the ink composition was large, the discharge stability was poor, and also, adhesion of an image to a substrate and film strength were insufficient.

What is claimed is:

1. A polymerizable composition comprising: a polymer compound containing at least one of a repeating unit represented by the following Formula (1) or a repeating unit represented by the following Formula (2); a polymerization initiator; and a polymerizable compound

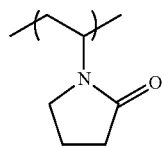

Formula (1)

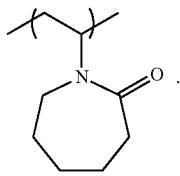

Formula (2)

2. The polymerizable composition according to claim 1, wherein the polymer compound is a branched polymer compound comprising: a skeleton structure derived from a multifunctional thiol that is from trifunctional to hexafunctional; and a plurality of polymer chains that include at least one of the repeating unit represented by Formula (1) or the repeating unit represented by Formula (2) and that are connected to the skeleton structure via a sulfide bond.

3. The polymerizable composition according to claim 2, wherein the multifunctional thiol is a hexafunctional thiol.

4. The polymerizable composition according to claim 2, wherein the multifunctional thiol is at least one selected from dipentaerythritol hexakis(3-mercaptopropionate), dipentaerythritol hexakis(2-mercaptoacetate), or dipentaerythritol hexakis(2-mercaptopropionate).

5. The polymerizable composition according to claim 2, wherein the polymer chains of the polymer compound further comprise a repeating unit derived from at least one of 2-phenoxyethyl acrylate, 2-(2-ethoxyethoxy)ethyl acrylate, or isobornyl acrylate.

6. The polymerizable composition according to claim 2, wherein each of the plurality of polymer chains further comprises a (meth)acrylic repeating unit selected from the group consisting of a repeating unit derived from a (meth)acrylate having a $C_{1-8}$ linear hydrocarbon group which may include an oxygen atom, a $C_{3-8}$ branched hydrocarbon group which may include an oxygen atom, a $C_{3-8}$ alicyclic hydrocarbon group which may include an oxygen atom, or a $C_{6-8}$ aromatic hydrocarbon group which may include an oxygen atom; a repeating unit derived from a (meth)acrylate having a $C_{9-10}$ alicyclic hydrocarbon group; and a repeating unit derived from (meth)acrylic acid.

7. The polymerizable composition according to claim 1, wherein a total content of the repeating unit represented by Formula (1) and the repeating unit represented by Formula (2) in the polymer compound is 40 mol % or higher with respect to a total amount of repeating units of the polymer compound.

8. The polymerizable composition according to claim 1, wherein the weight-average molecular weight of the polymer compound is from 1,000 to 30,000.

9. The polymerizable composition according to claim 1, wherein the polymerizable compound comprises at least one monofunctional polymerizable compound.

10. The polymerizable composition according to claim 1, wherein the polymerizable compound comprises at least one of N-vinylcaprolactam, 2-phenoxyethyl acrylate, cyclic trimethylol propane formal acrylate, isobornyl acrylate, tetrahydrofurfuryl acrylate, 2-(2-ethoxyethoxy)ethyl acrylate, 2-(2-vinyloxyethoxy) ethyl acrylate, octyl acrylate, decyl acrylate, tridecyl acrylate, isodecyl acrylate, lauryl acrylate, 3,3,5-trimethylcyclohexyl acrylate, or 4-t-butylcyclohexyl acrylate.

11. The polymerizable composition according to claim 1, wherein the polymerizable compound comprises at least one multifunctional polymerizable compound.

12. The polymerizable composition according to claim 1, wherein the polymerization initiator comprises at least one of an α-aminoketone compound or an acylphosphine oxide compound.

13. An ink composition for ink jet recording, comprising the polymerizable composition according to claim 1.

14. A method of ink jet recording, comprising:
a process of discharging the ink composition for ink jet recording according to claim 13 onto a recording medium using an ink-jet recording apparatus; and a process of irradiating the discharged ink composition for ink jet recording with an active energy radiation, thereby curing the ink composition for inkjet recording.

15. A printed article recorded by the method of inkjet recording according to claim 14.

* * * * *